US007788796B2

(12) United States Patent
Hsiao et al.

(10) Patent No.: US 7,788,796 B2
(45) Date of Patent: Sep. 7, 2010

(54) METHOD FPR MANUFACTURING A MAGNETIC WRITE HEAD

(75) Inventors: Wen-Chien David Hsiao, San Jose, CA (US); Ming Jiang, San Jose, CA (US); Vladimir Nikitin, Campbell, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 860 days.

(21) Appl. No.: 11/611,824

(22) Filed: Dec. 15, 2006

(65) Prior Publication Data

US 2008/0144215 A1 Jun. 19, 2008

(51) Int. Cl.
*G11B 5/127* (2006.01)
*H04R 31/00* (2006.01)

(52) U.S. Cl. .............. 29/603.16; 29/603.11; 29/603.13; 29/603.14; 29/603.15; 29/603.18; 216/62; 216/65; 216/66; 360/121; 360/122; 360/317; 451/5; 451/41

(58) Field of Classification Search .............. 29/603.11, 29/603.13–603.16, 603.18; 216/62, 65, 66; 360/121, 122, 317; 427/127, 128; 451/5, 451/41
See application file for complete search history.

(56) References Cited

U.S. PATENT DOCUMENTS 5,966,800 A * 10/1999 Huai et al. ............... 29/603.13
6,118,629 A * 9/2000 Huai et al. ............. 360/125.43
6,188,544 B1 * 2/2001 Mino .................... 360/125.46
6,230,390 B1 * 5/2001 Guo et al. ................ 29/603.14
6,609,948 B1 8/2003 Fontana, Jr. et al. ............ 451/5
6,884,148 B1 4/2005 Dovek et al. ................... 451/5
2005/0030669 A1 2/2005 Bunch et al. ............. 360/236.6
2005/0047013 A1 3/2005 Le et al. ..................... 360/126
2005/0068671 A1 3/2005 Hsu et al. ................... 360/125
2005/0070206 A1 3/2005 Kasiraj et al. .................. 451/5

* cited by examiner

*Primary Examiner*—Paul D Kim
(74) *Attorney, Agent, or Firm*—Zilka-Kotab, PC

(57) ABSTRACT

A method for constructing a magnetic write head using an electrical lapping guide to carefully control critical dimensions during a lapping operation used to define an air bearing surface. The lapping guide is photolithograhically patterned in a common photolithographic step with another write head structure so that special relation between the lapping guide and critical dimensions of the write head structure can be carefully maintained. The electrical lapping guide can be patterned in a common photolithographic step as the write pole so that the location of the flare point can be carefully controlled with respect to the location of the lapping guide. A stitched flare structure can also be built together with the electrical lapping guide, then a self-aligned shield can be further built over this stitched flare structure so that both flare point and shield throat can be controlled tightly together by this electrical lapping guide during lapping process.

7 Claims, 46 Drawing Sheets

4 328 121 322 310 311 5 5 312 316 330 317 317 317 317 316 302 ABS 314 4 309 304 308 305 307 306 328

METHOD FPR MANUFACTURING A MAGNETIC WRITE HEAD

FIELD OF THE INVENTION

The present invention relates to the construction of perpendicular magnetic write heads and more particularly to the use of an electrical lapping guide for accurately defining write pole flare point and shield throat height.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally has included a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Recently, researchers have focused on the development of perpendicular magnetic recording systems in order to increase the data density of a recording system. Such perpendicular recording systems record magnetic bits of data in a direction that is perpendicular to the surface of the magnetic medium. A write head used in such a system generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic medium. This flux returns to the write head at the return pole where it is sufficiently spread out and weak that it does not erase the signal written by the write pole.

The write pole typically has a flare point that is recessed a desired distance from the ABS. In addition, such a perpendicular magnetic write head may include a trailing shield that increases field gradient by canting the write field somewhat. This trailing magnetic shield has a throat height that is its thickness as measured from the ABS. Both the location of the write pole flare point and as well as the trailing shield throat height are critical dimensions that should be tightly controlled to ensure optimal magnetic performance. Maintaining these critical dimensions, however, becomes increasingly difficult to achieve as the size of such magnetic write heads becomes ever smaller.

Magnetic write heads are constructed upon a wafer, with thousands of such write heads being constructed on a single wafer. To form a slider, a wafer is cut into rows of sliders, and then this row of sliders is lapped to form an air bearing surface (ABS). This lapping surface determines critical dimensions such as the throat height of the trailing shield and the flare location of the yoke. Unfortunately, lapping processes are difficult to control, especially at the accuracy needed for very small write heads. This makes it difficult to control the trailing shield throat height flare location. Therefore, there is a strong felt need for a process that can allow tight control of critical dimensions such as trailing shield throat height and write pole flare location.

SUMMARY OF THE INVENTION

The present invention provides a method for constructing a magnetic write head using an electrical lapping guide that has been constructed in a common photolithographic step with other structural elements of the write head. This common photolithographic process allows the location of the electrical lapping guide to be carefully controlled relative to critical dimensions of the structural element of the write head.

For example, the lapping guide can be formed in the same photolithographic step as the write pole thereby allowing the location of the write pole flare point to correspond very accurately with the location of the electrical lapping guide (ELG).

The write head may include a stitched flare structure, formed over the write pole, that defines the location of the flare point. The ELG can advantageously be defined in the same photolithographic process used to define this stitched flare structure.

Similarly, the ELG can be defined in the same photolithographic step used to define a trailing magnetic shield. In this way, the relative locations of the trailing shield and ELG can be carefully maintained allowing the throat height of the trailing shield to be carefully controlled during lapping.

In addition, the present invention provides a way to monitor variation in critical dimensions during manufacture. Certain processes such as reactive ion etching (RIE) and ion milling used to define the write pole cause certain critical dimensions of the write pole to move in a different direction and at a different rate than the dimensions of the ELG. By providing a marker near the write pole and a marker near the ELG, the relative movements of the critical dimensions of the write pole and ELG (eg. flare point) can be measured. This measurement can then be factored into a determination of a desired ABS location. A lapping process can be performed while measuring an electrical resistance across the ELG. The lapping process can then be terminated when a predetermined resistance has been reached.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
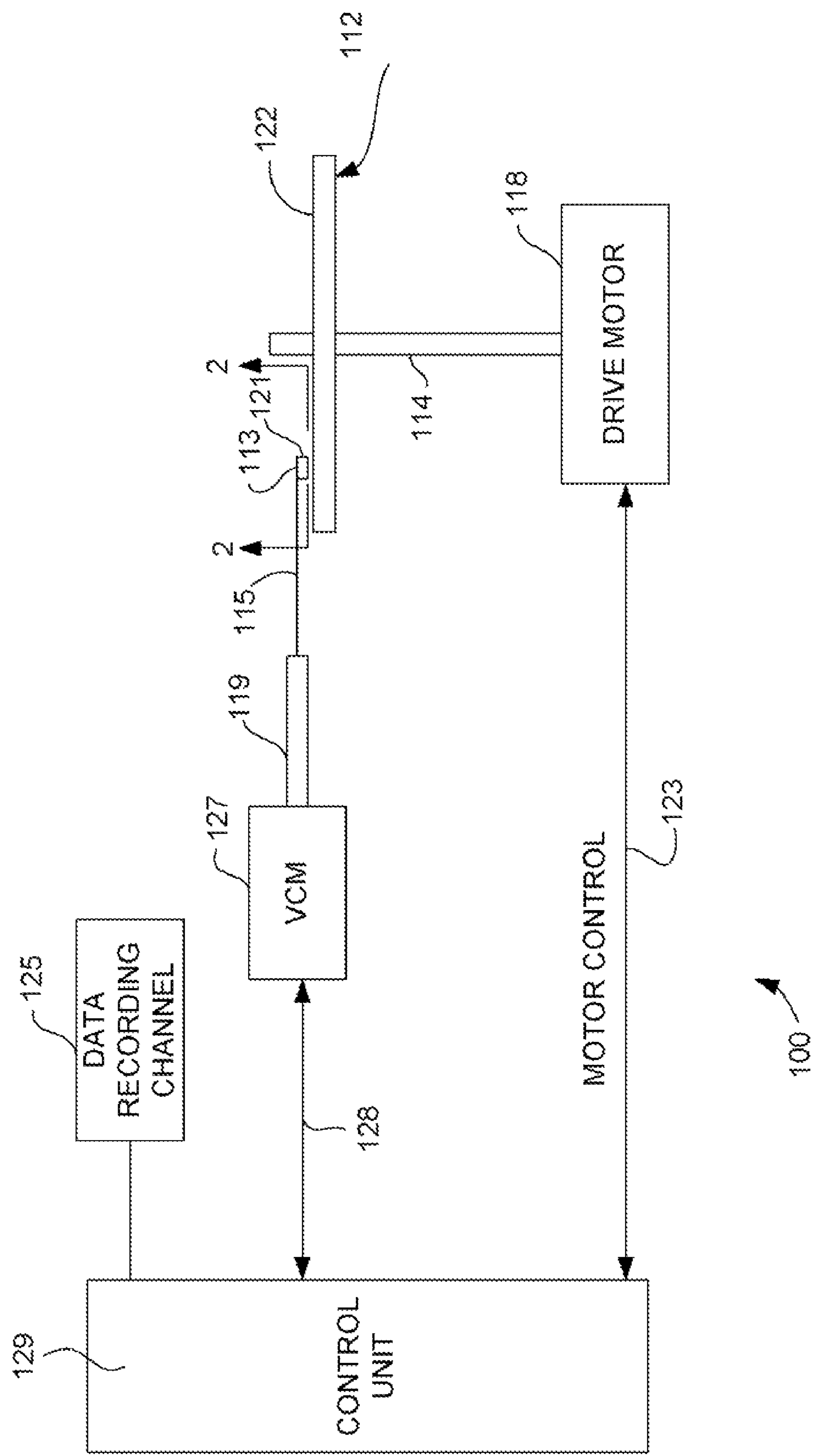
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic, field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
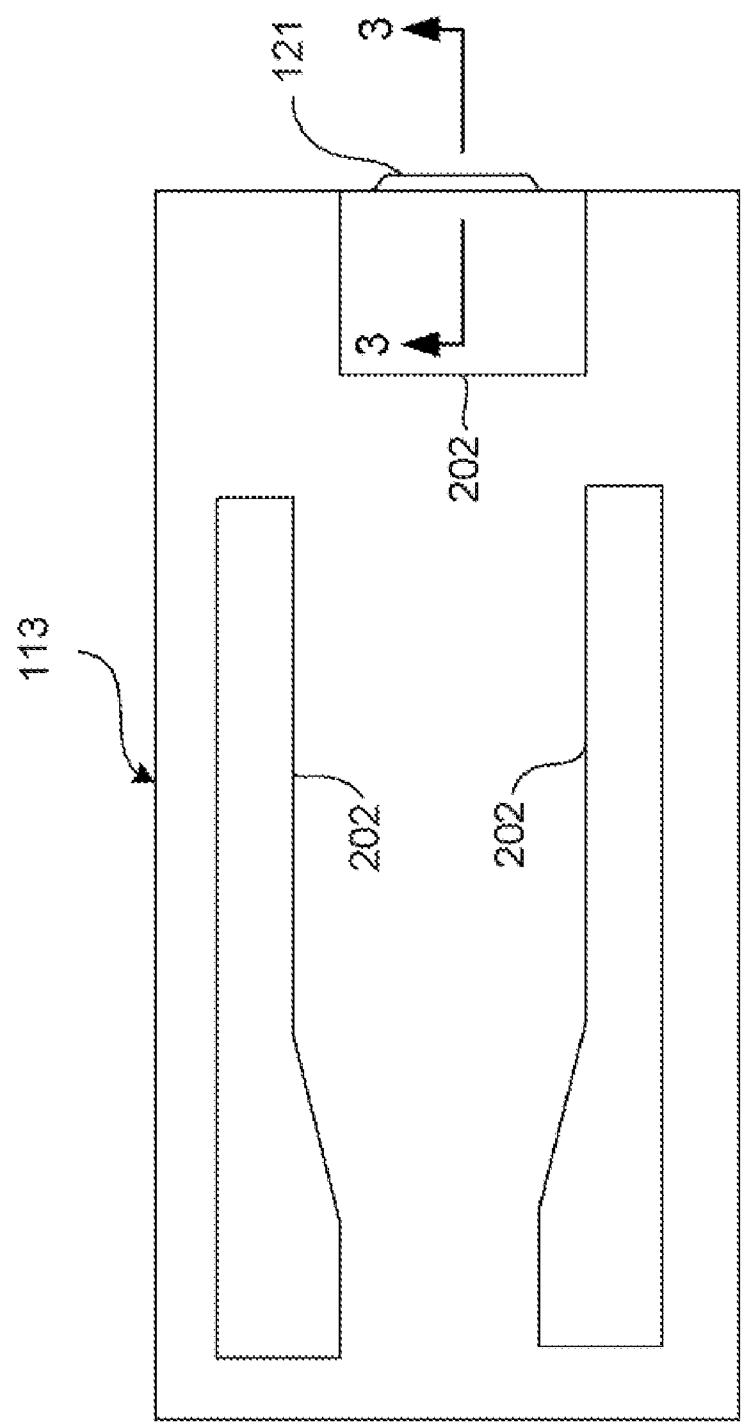
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
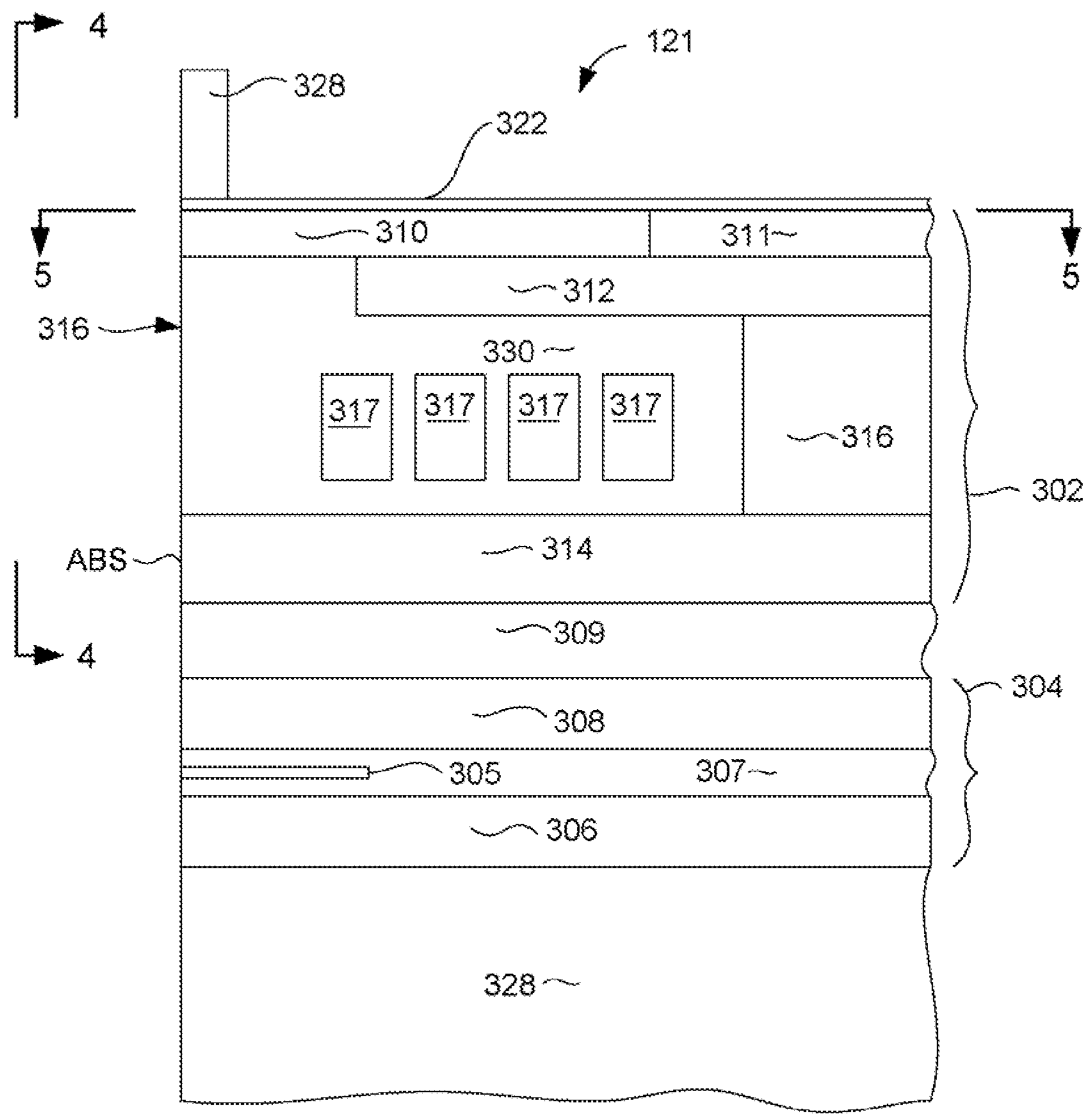
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305, could be for example, a current in plane giant magnetoresistive sensor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields 306, 308, which can be constructed of for example CoFe, NiFe or sendust, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can act as electrically conductive leads for supplying a sense current to the sensor 305.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a magnetic material. The write head 302 also includes a return pole 314 that is constructed of a magnetic material such as CoFe or NiFe and has a cross section parallel to the ABS surface that is significantly larger than that of write pole 310. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The coil 317 is embedded in an insulation layer 330 that can be, for example, alumina and can include one or more layers of one or more materials.

The write element 302 can also include a trailing magnetic shield 328 that is separated from the write pole in the trailing direction by a non-magnetic trailing shield gap 322. The trailing shield can be constructed of a magnetic material such as NiFe, CoFe, etc. The trailing shield 328 has a throat height TH that is measured from the air bearing surface (ABS) to its back edge.

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). This magnetic field emitted from the write pole 310 magnetizes a relatively higher coercivity, thin, top magnetic layer on the magnetic medium (not shown in FIG. 3). This magnetic field travels through a magnetically soft underlayer of the magnetic medium to the return pole 314, where it is sufficiently spread out that it does not erase the signal written by the write pole 310.

Figure 4:
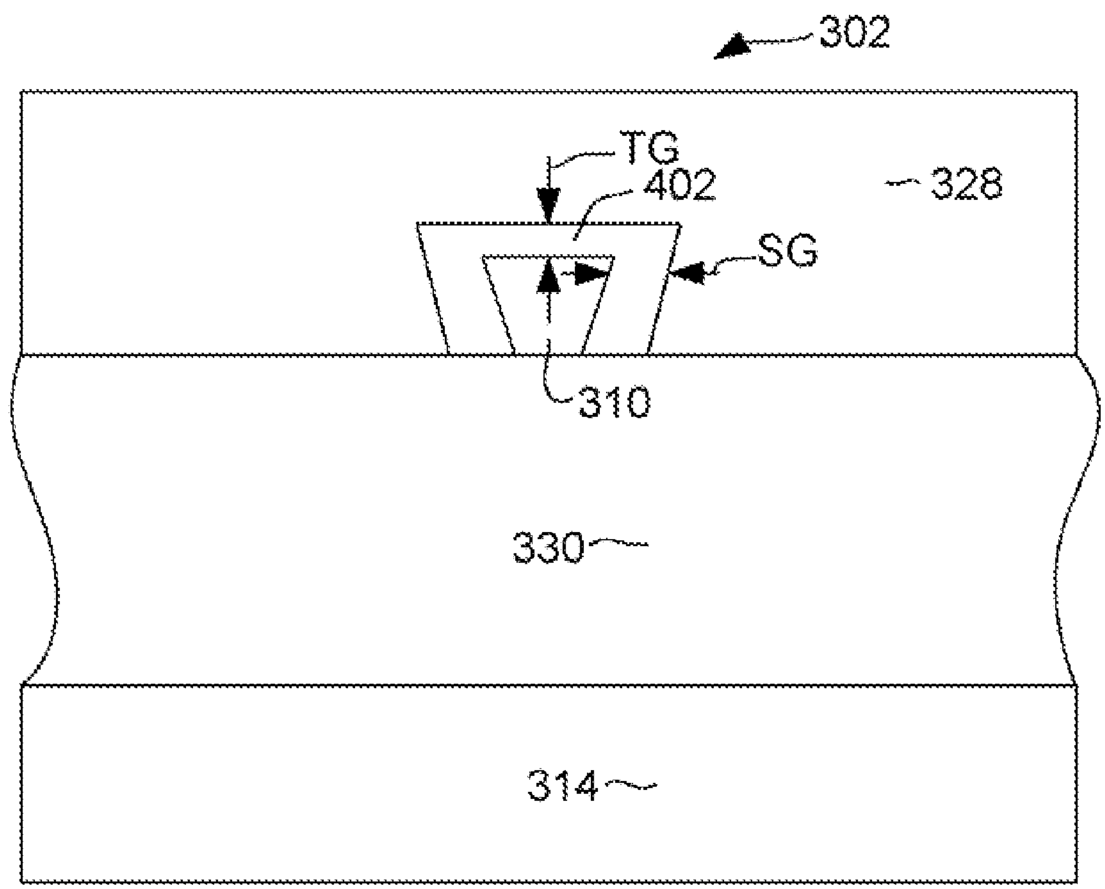
FIG. 4 is an ABS view taken from line 4-4 of FIG. 3 of a write head.

With reference to FIG. 4, which shows an ABS view of the write element 302, it can be seen that the write pole 310 preferably has a trapezoidal shape. This shape helps to reduce skew related adjacent track interference. In addition it can be seen that the trailing shield 328 can be formed to wrap around the sides of the write pole 310. This wrap around feature helps to prevent stray fields from the write head from reaching the magnetic medium and helps to control track width definition. Alternatively, the trailing shield could be constructed so that it does not wrap around the write pole 310, but performs only a trailing function. Such a construction could be useful when it is necessary to reduce the amount of flux lost to the trailing shield 310.

The trailing shield is separated from the write pole 310 by a non-magnetic material 402, which could be one or more layers of non-magnetic material. The sides of the write pole 310 are separated from the wrap around portions of the trailing shield 328 by a side gap (SG). The trailing edge of the write pole 310 is separated from the trailing shield 328 by a trailing gap (TG). The thickness of the trailing gap TG is more critical than the thickness of the side gap SG, and is typically smaller than the side gap SG.

Figure 5:
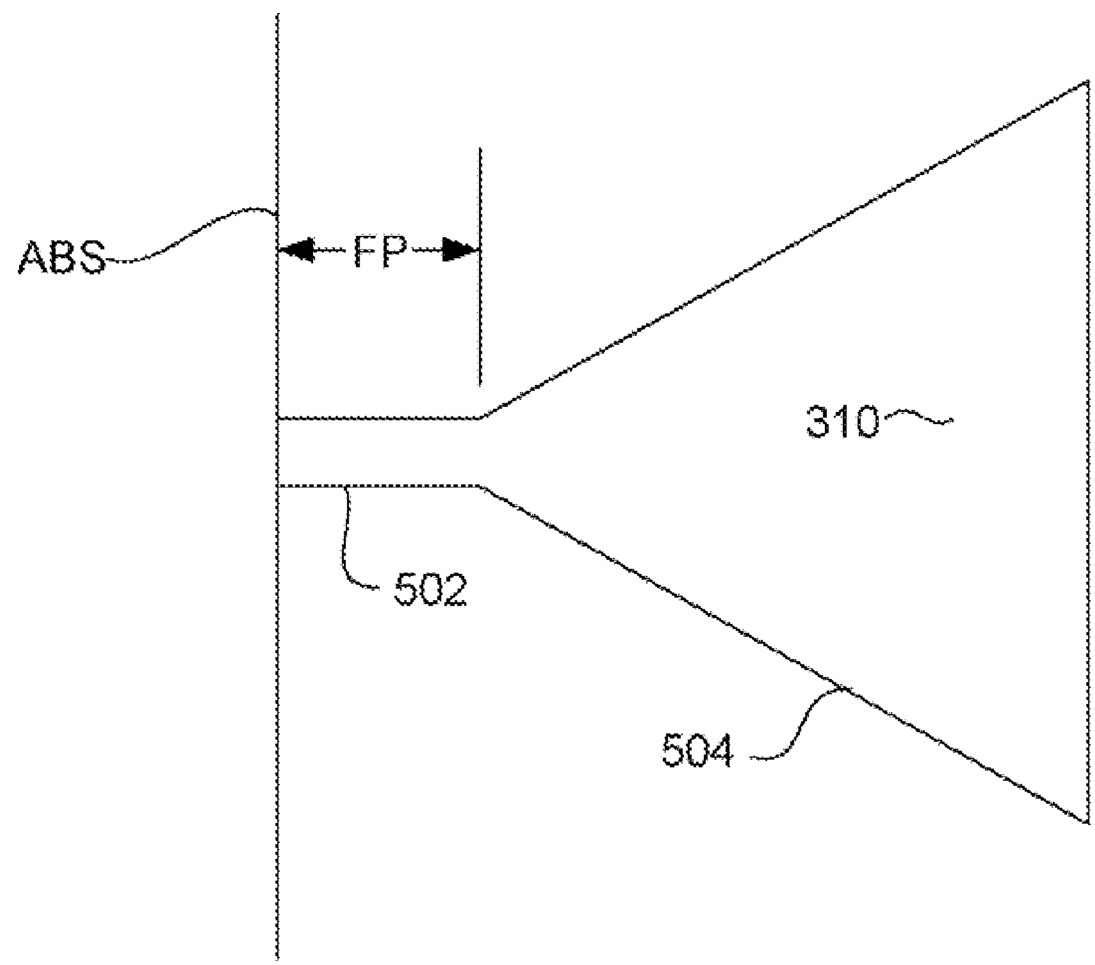
FIG. 5 is a top down view taken from line 5-5 of FIG. 3.

With reference now to FIG. 5, it can be seen that the write pole 310 has a narrow constant width portion 502 and a flared portion 504. The location of the transition between the narrow constant width portion 502 and the flared portion 504 is the flare point 506 and is measured from the ABS as the flare point location (FP). This distance FP is a critical dimension that should be carefully controlled to ensure optimal magnetic performance.

Figure 6:
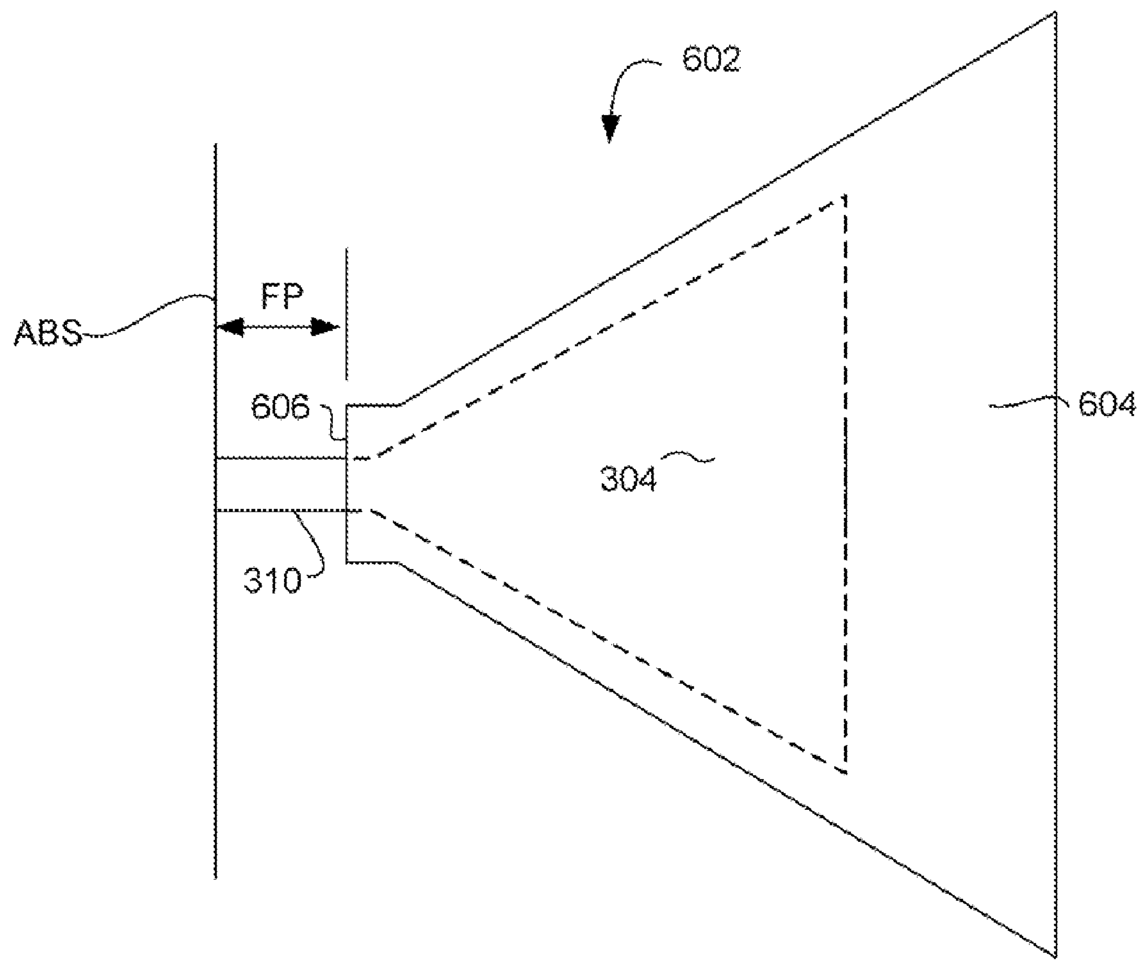
FIG. 6 is a top down view of a write head according to an embodiment of the invention.

With reference to FIG. 6, in an alternate embodiment of the invention, a write element 602 includes a stitched flare structure 604 formed over and magnetically connected with the write pole 310. FIG. 6 is a view similar to that of FIG. 5, and because the stitched flare structure 604 is formed over the write pole 310, most of the write pole 310 is hidden by the stitched pole 604. Therefore, the hidden portion of the write pole 310 has been shown in dashed line in FIG. 6. In this embodiment, the stitched flare structure 604 has a front edge 606, located toward the ABS, which defines the flare point FP as measured from the ABS. In this way, the stitched flare structure 604 improves the control of the FP location during manufacturing. The stitched flare structure 604 also promotes the flow of flux to the write pole, thereby improving magnetic performance of the write head.

Figure 7:
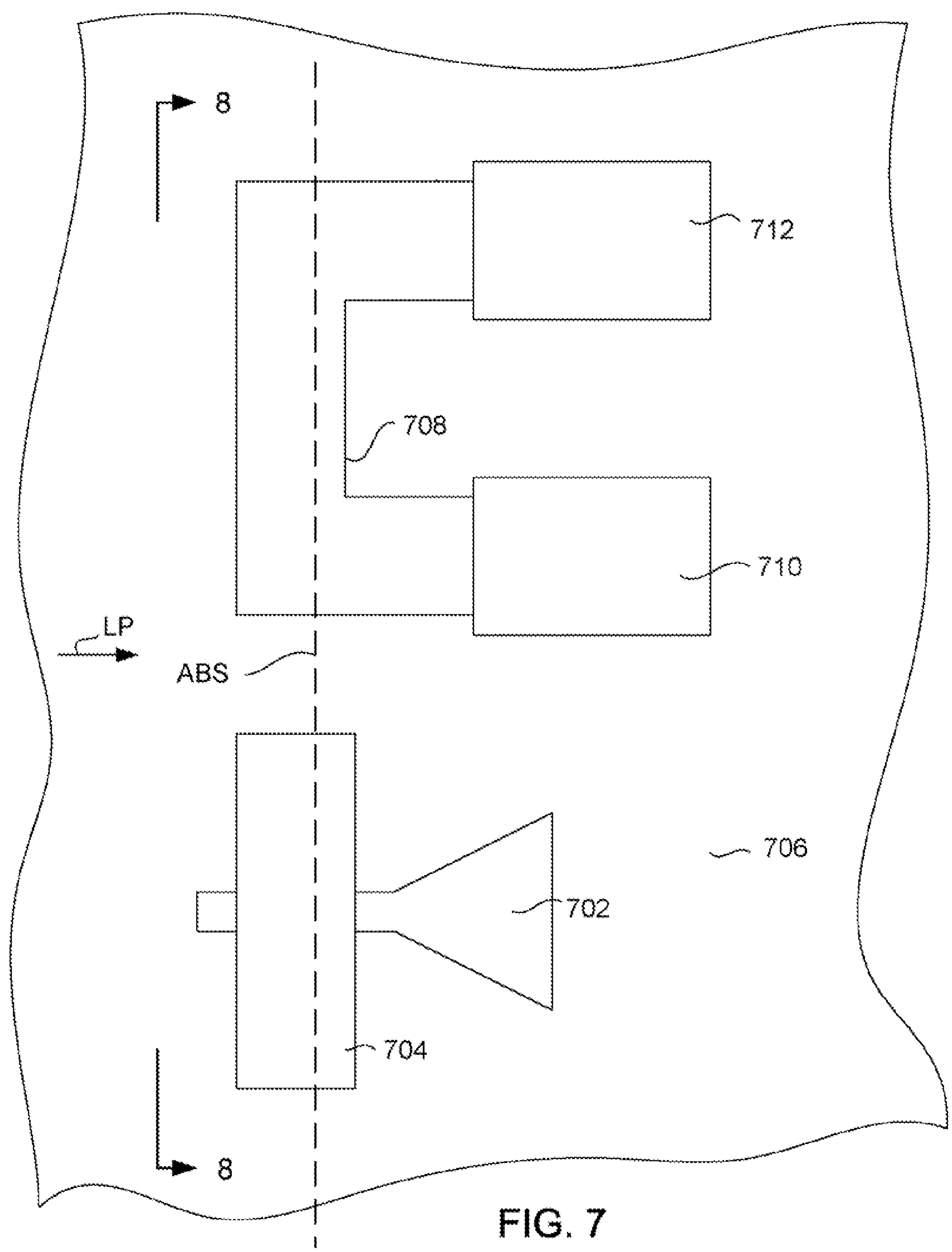
FIG. 7 is a top down view of a write head and an electrical lapping guide according to an embodiment of the invention.

With reference now to FIGS. 7-15, a method for controlling the throat height of a trailing shield is described. The method involves the use of a novel electronic lapping guide. With particular reference to FIG. 7, a top down view of a write pole 702 is shown with a trailing shield 704 formed there over. The write pole 702 and trailing shield 704 are both constructed of a magnetic material and are separated from one another by a non-magnetic gap layer (not shown in FIG. 7). The trailing shield 704 can be constructed of a magnetic material such as NiFe or CoFe, and the write pole 702 can be constructed of a lamination of magnetic layers separated by thin non-magnetic layers. Both the write pole 702 and the trailing shield 704 extend beyond an intended air bearing surface plane ABS, which will be defined by a future lapping process that removes portions of the trailing shield 704 and write pole 702 that extend beyond the ABS. The write head 702 and trailing shield 704 are constructed upon a substrate 706 that may include, for example an alumina fill layer and a magnetic shaping layer as described previously with reference to FIG. 3.

The structure shown in FIG. 7 also includes a lapping guide 708, which also may be formed on the substrate 706. The lapping guide is formed in the same photolithographic step as that in which the trailing shield 704 is defined. In this way, the relative locations of the electrical lapping guide 708 and the trailing shield 704 can be carefully controlled. The lapping guide 708 is constructed of an electrically conductive material such as Rh, and can be thinner than the trailing shield 704.

Electrical contacts 710, 712 may be connected with the lapping guide 708 at locations away from the ABS.

The lapping guide functions to give an operator an indication of how far lapping has progressed, when a row of sliders is being lapped to form the ABS. As lapping progresses in the direction indicated by the arrow LP, material will be removed from the front edge of the lapping guide 708 as well as from the trailing shield 704 and write pole 702. As material is removed from the lapping guide 708 the electrical resistance across the lapping guide (ie. from one contact 710 to the other 712 will increase. This increase in resistance can be measured by applying an electrical potential across the lapping guide 708 during lapping. When the desired ABS location has been reached (indicated by dashed line ABS) the resistance across the lapping guide 708 will reach a predetermined value indicating that the lapping operation can be terminated.

Figure 8:
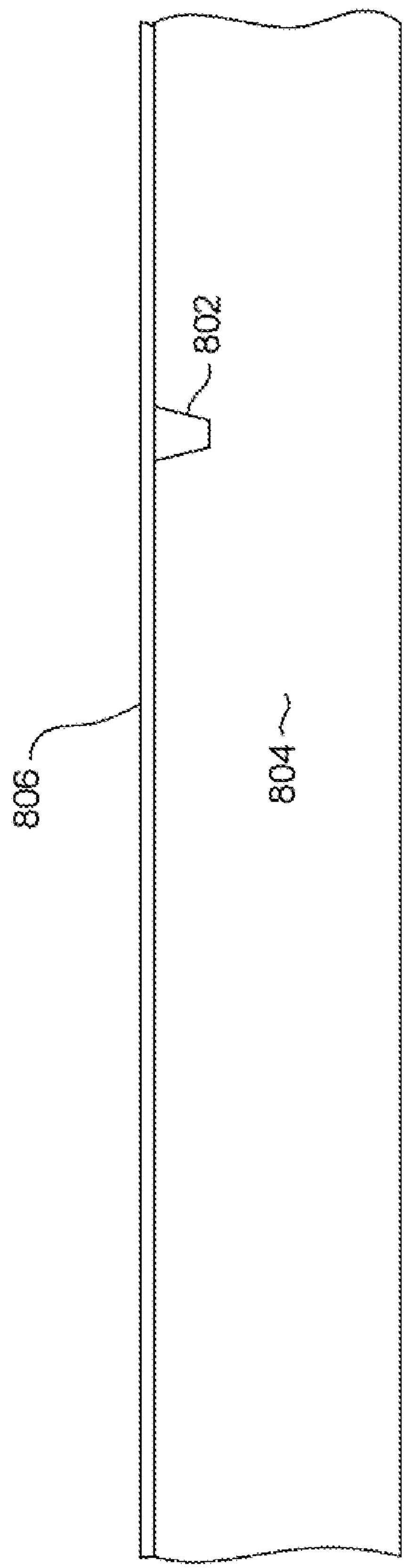
FIGS. 8-15 show a magnetic head in various intermediate stages of manufacture, illustrating a method of manufacturing a write head and electrical lapping guide according to an embodiment of the invention.

With reference now to FIGS. 8-15, a method for constructing the above electric lapping guide structure will be described. With particular reference to FIG. 8, a write pole 802 is formed and embedded in a non-magnetic substrate layer 804. The non-magnetic substrate layer 804 can be planarized by chemical mechanical polishing CMP to form a smooth surface that can be coplanar with the trailing edge of the write pole 802. A layer of electrically conductive non-magnetic seed material such as Rh, Ir, Ru, Au, W, Ta or any other noble metal 806 can be deposited over the write pole 802 and non-magnetic substrate 804.

Figure 9:
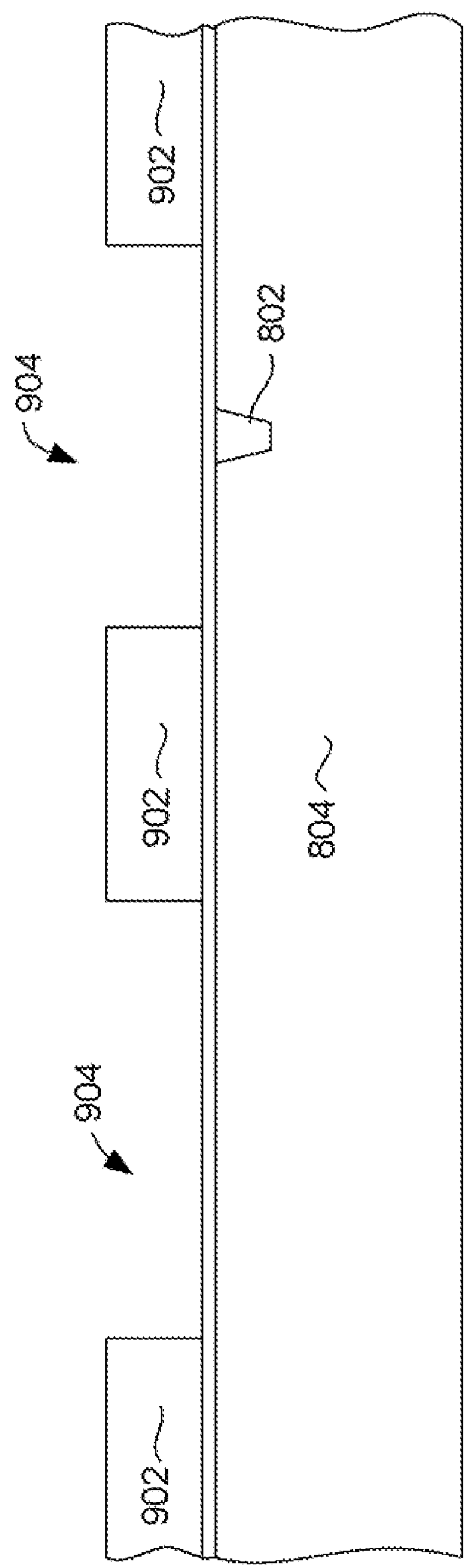

With reference now to FIG. 9, a mask 902 is formed over the electrically conductive layer 806. The mask 902 can be constructed of a resist material such as photoresist or thermal Image resist, and has openings 904 that define the trailing shield 704 and lapping guide 708 described earlier with reference to FIG. 7. Therefore, the openings 904 have the shape of the trailing shield 704 and lapping guide 708 when viewed from above as in FIG. 7.

Figure 10:
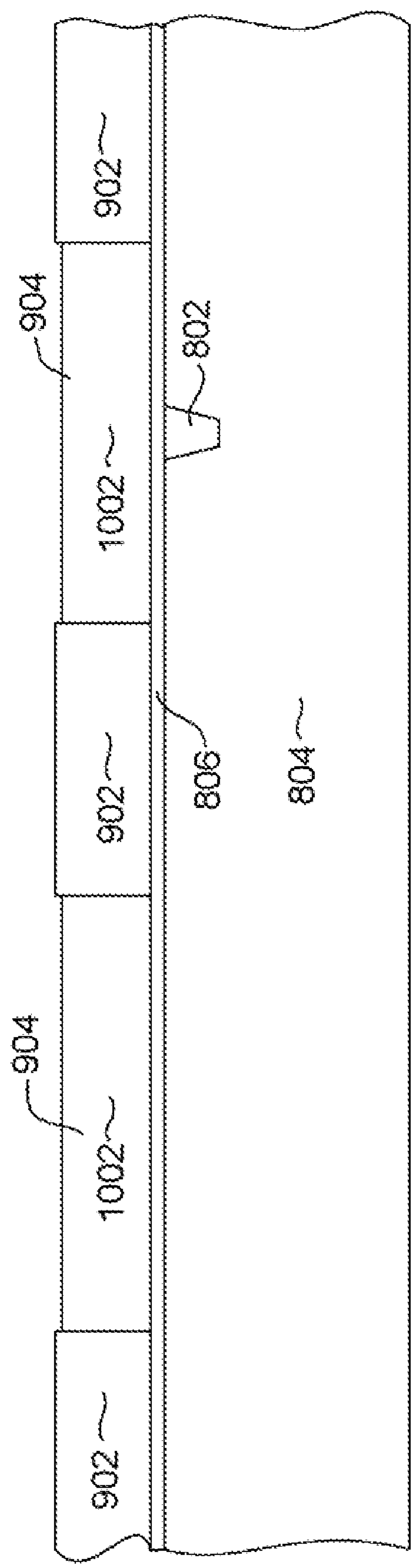
Figure 11:
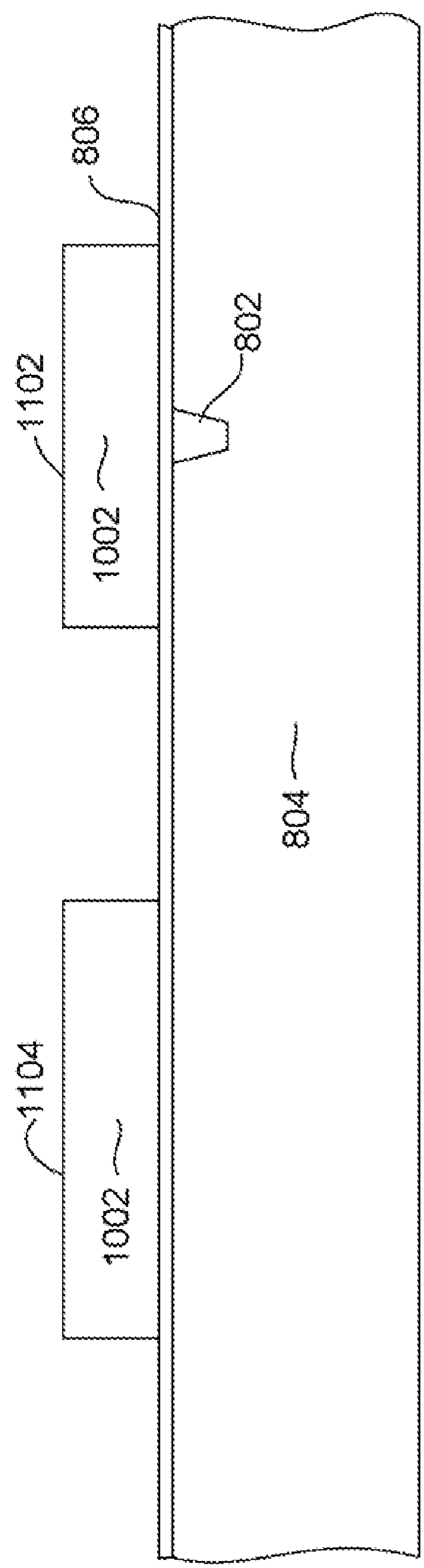

With reference now to FIG. 10, a magnetic material such as NiFe, CoFe or some other magnetic material is plated into the openings 904 in the mask 902, using an underlying electrically conductive layer 806 as an electroplating seed. Then, the mask is lifted off leaving a structure as shown in FIG. 11, with the magnetic material 1002 formed over the seed layer 806. The mask 902 can be lifted by a chemical liftoff process. One of the portions of the magnetic material 1002 defines a trailing shield 1102, while the other 1104 provides a mask for defining the electrical lapping guide.

Figure 12:
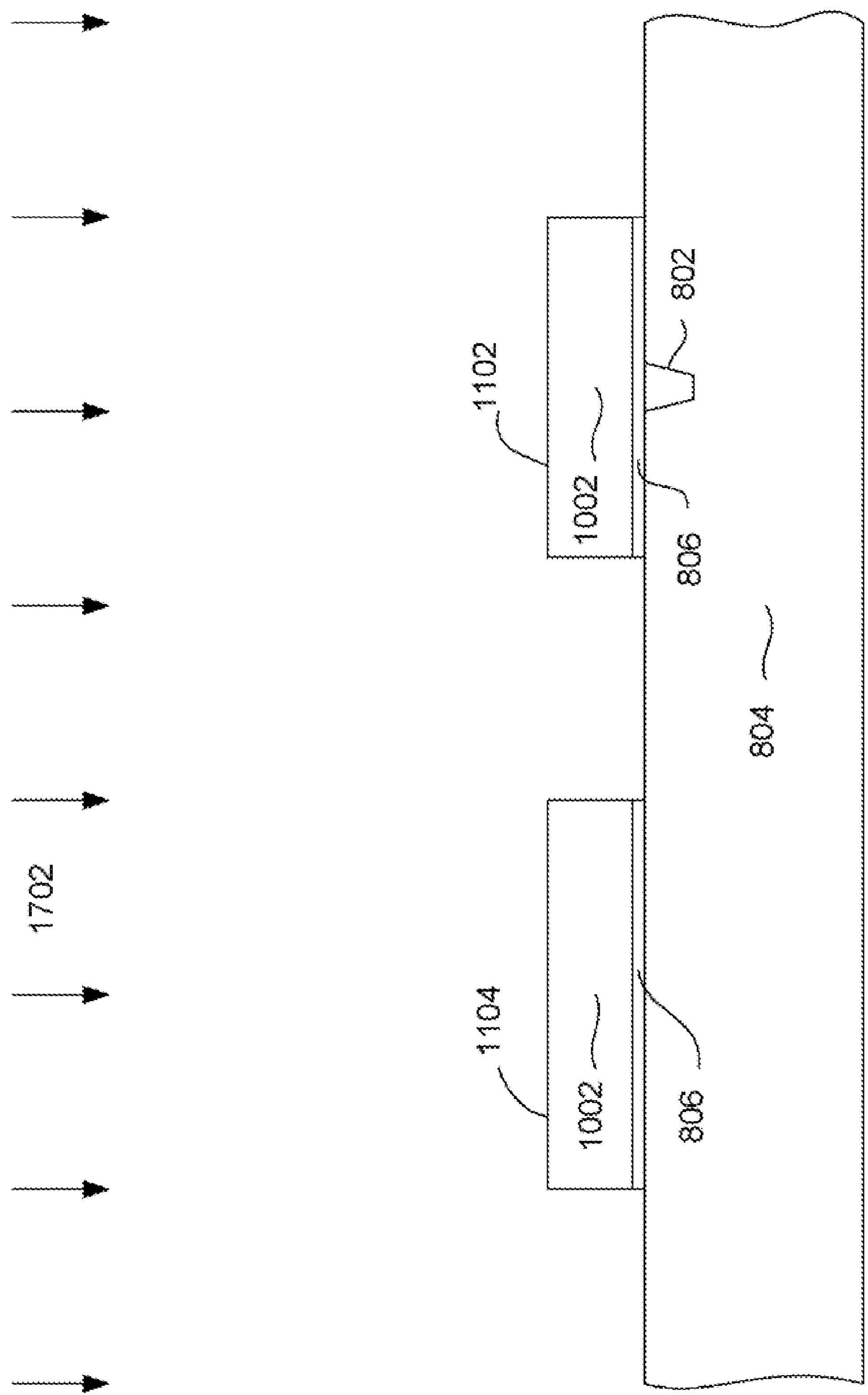
Figure 13:
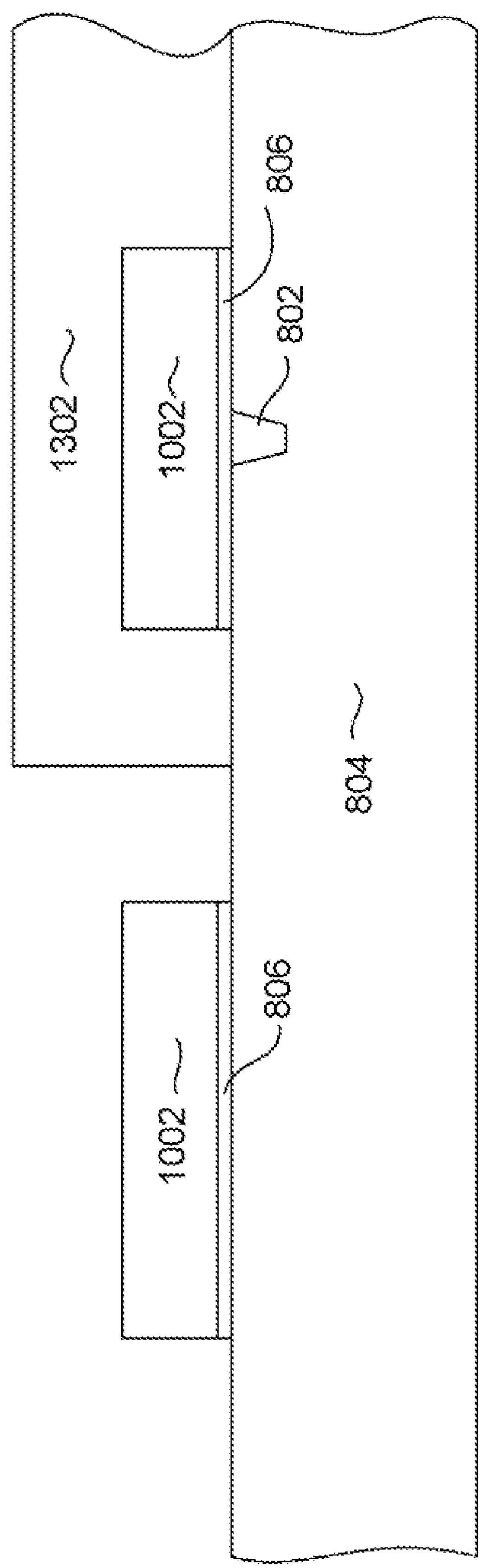
Figure 14:
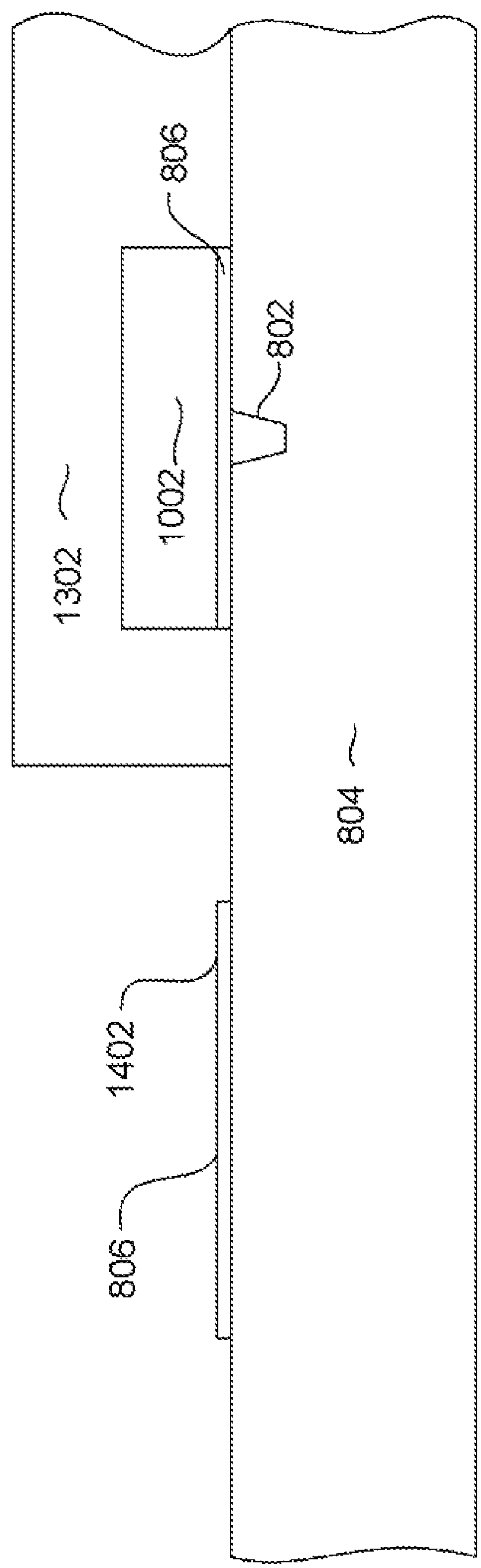
Figure 15:
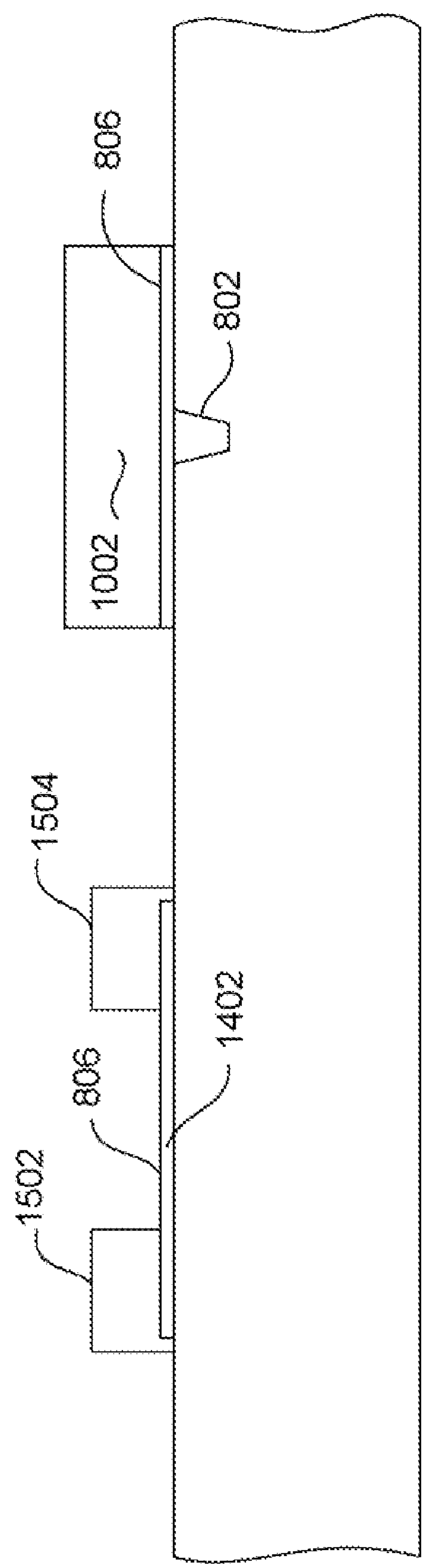

With reference now to FIG. 12 a material removal process such as ion milling 1202 is performed. This milling process 1202 removes portions of the electrically conductive layer 806 that are not protected by the overlying magnetic layers 1002. Then, with reference to FIG. 13, a mask 1302 is formed to cover and protect the trailing shield 1102 and write pole 802, leaving the trailing shield defining mask structure 1104 uncovered. The mask 1302 can be a photoresist, thermal image resist, etc. With reference to FIG. 14, with the mask 1302 in place a chemical process is performed to remove the magnetic layer 1002 from over the lapping guide area, leaving the underlying Rh layer (or other conductive material) 806 intact. This remaining electrically conductive material 806 forms the electrical lapping guide 1402, such as the lapping guide 708 described earlier with reference to FIG. 7. Then, with reference to FIG. 15, an electrically conductive material 1502 such as Cu can be electrically plated over the back edges of the lapping guide 806 to form the contacts 710, 712 described earlier with reference to FIG. 7.

The above described process creates an electrical lapping guide that is accurately aligned with the trailing shield. Because the lapping guide is defined in the same photolithographic step as the trailing shield, there is virtually no chance for misalignment as would be the case using separate photolighraphic steps.

Figure 16:
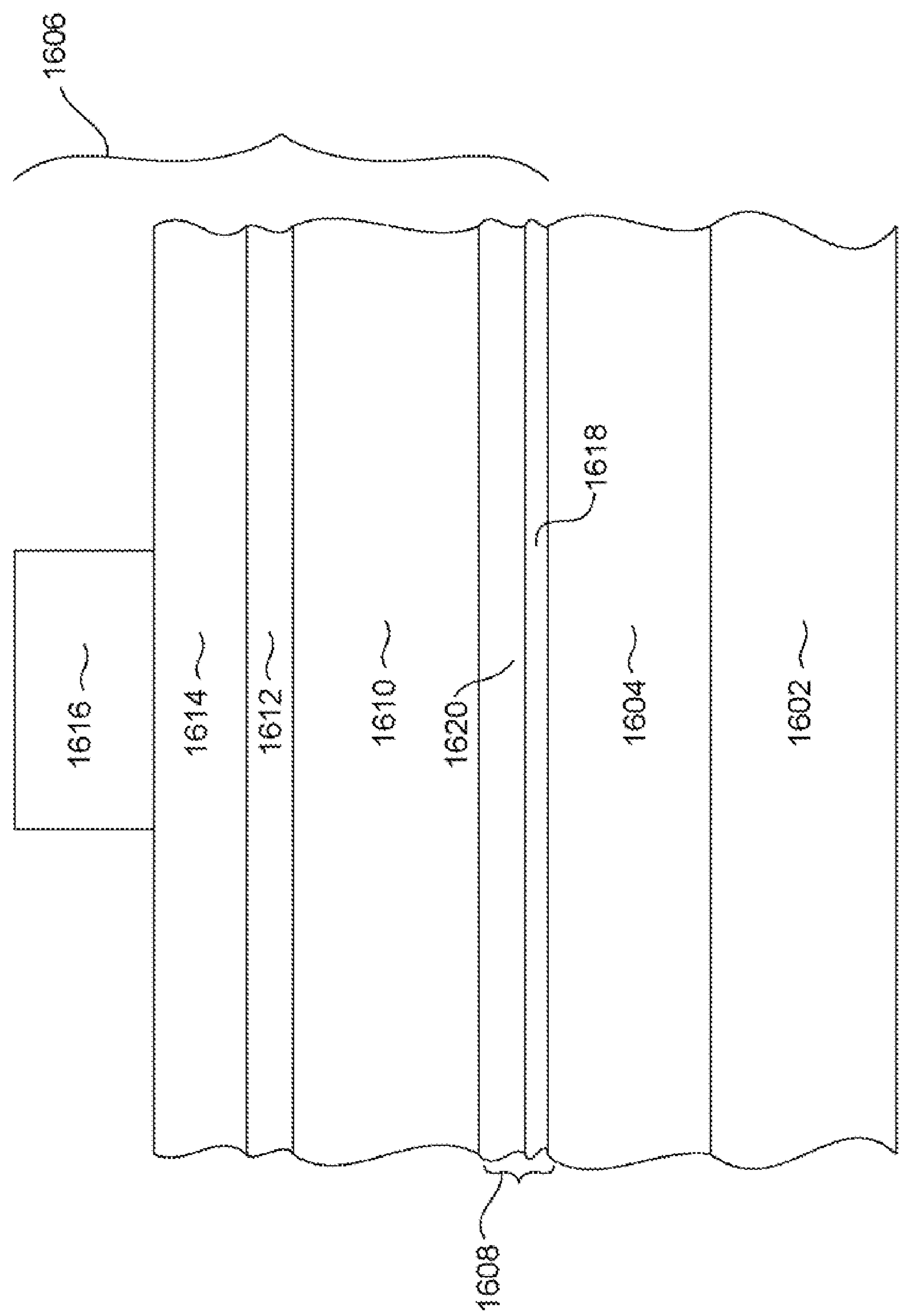
FIGS. 16-33 show a magnetic head in various intermediate stages of manufacture, illustrating a method of manufacturing a magnetic head according to another embodiment of the invention.
Figure 17:
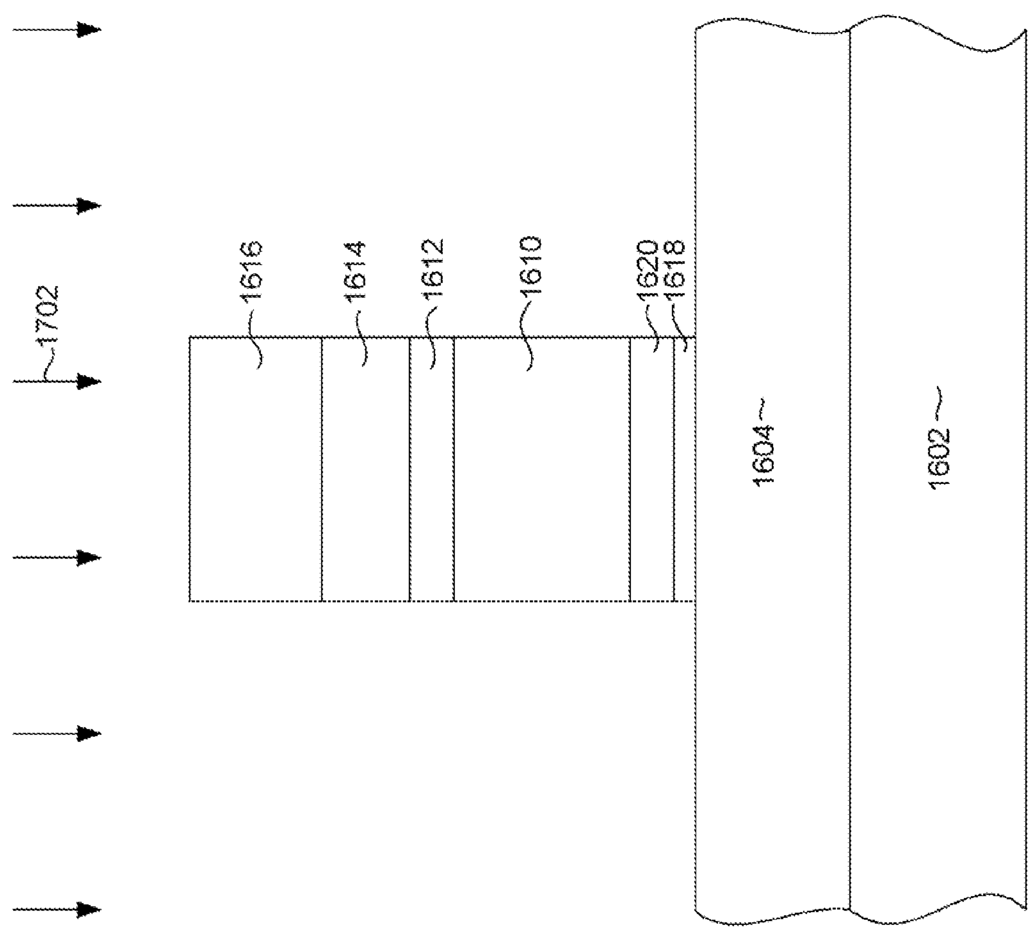

With reference now to FIGS. 16-33 a process for constructing lapping guide and write element according to another embodiment of the invention is described. The method described can be used to form a write element that can include a wrap around trailing shield and stitched flare structure. With particular reference to FIG. 16, a substrate 1602 is provided, which can include an insulation layer 330 and all or a portion of a shaping layer 312 as described in FIG. 3. A magnetic material 1604, is deposited full film over the substrate. The magnetic material 1604 can be constructed of several materials and is preferably a laminate of magnetic layers such as CoFe separated by thin layers of non-magnetic material.

A series of mask layers 1606 is then deposited over the magnetic layer 1604. The mask layers 1606 can include a thin first hard mask 1608, an image transfer layer 1610, a second hard mask layer 1612 a second image transfer layer 1614 and a resist mask 1616 such as photoresist or thermal image resist. The first hard mask 1608 may be a bi-layer or tri-layer hard mask that can include a first layer 1618, a second layer 1620 and possibly a third layer (not shown). The first layer 1618 can be, for example $Al_2O_3$, $Ta_2O_5$, SiN, SiON, Ta or $SiO_2$. The second layer 1620 can also be constructed of, for example alumina ($Al_2O_3$) or $Ta_2O_5$, SiN, SiON, Ta or $SiO_2$. The first and second image transfer layers 1610, 1614 can be constructed of a polyimide material such as DURAMID® or any other ion mill resistant material. The second hard mask layer 1612 can be constructed of for example, $SiO_2$ or $Al_2O_3$, SiN, TaO, etc.

The resist layer 1616 formed at the top of the mask structure 1606 can be photolithographically patterned to have a desired shape to define a write pole. Then, with reference to FIG. 17, a material removal process 1702 is performed to transfer the image of the photoresist layer 1616 onto the underlying layers, 1614, 1612, 1610, 1620, 1618. The material removal process 1702 may include one or more of reactive ion etching (RIE), and or reactive ion milling (RIM).

Figure 18:
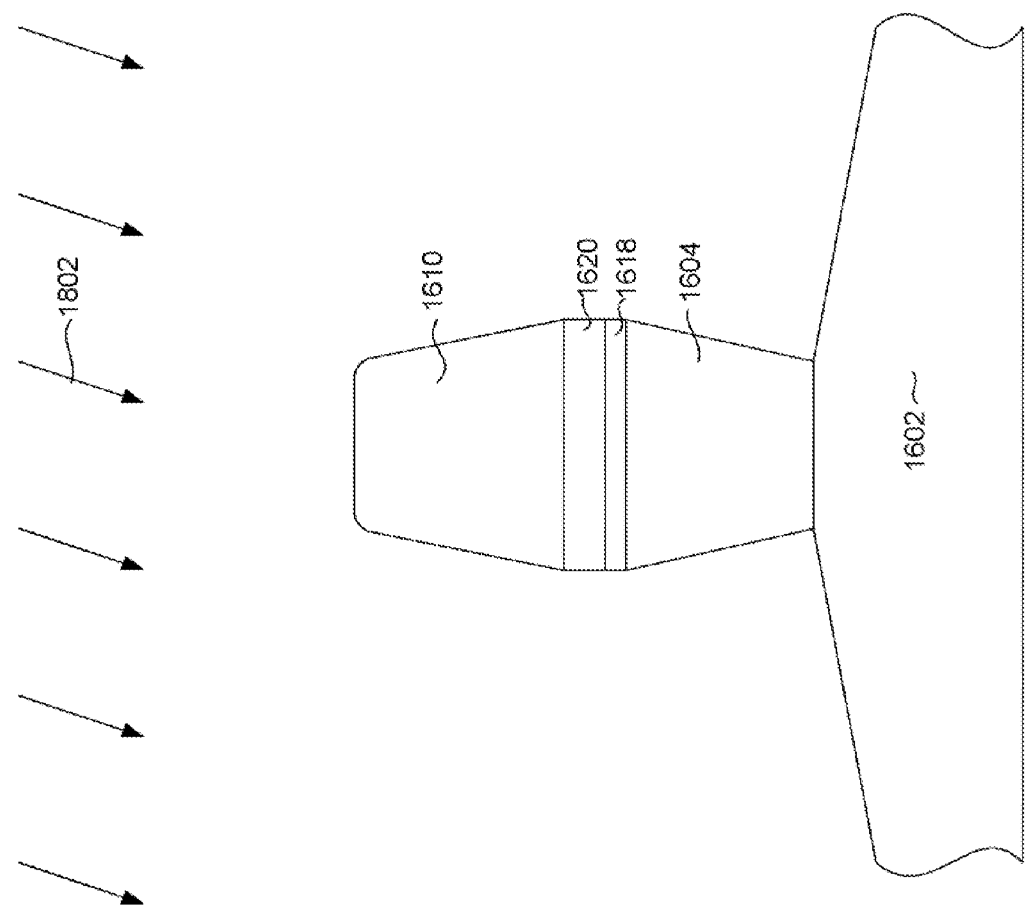
Figure 19:
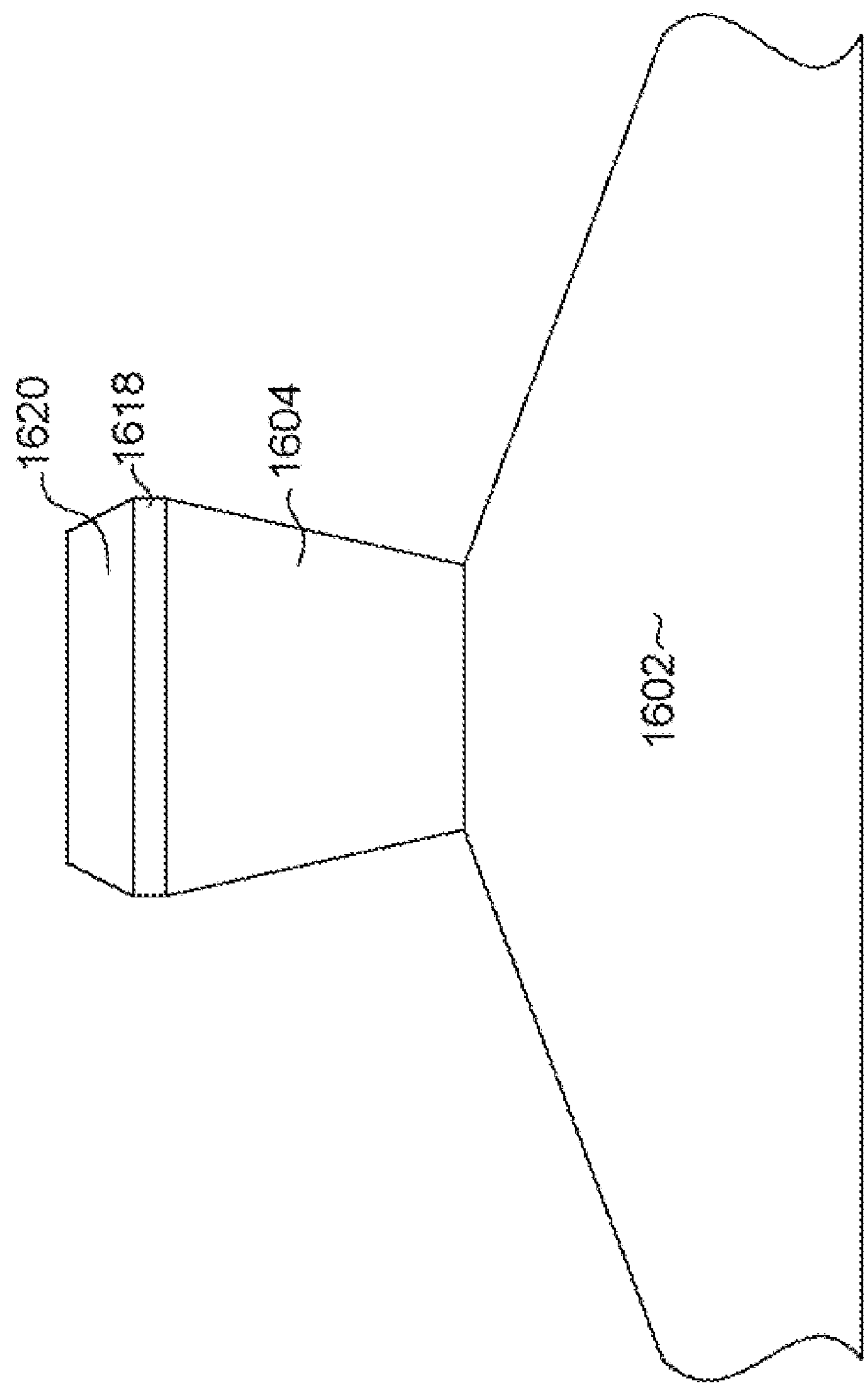
Figure 20:
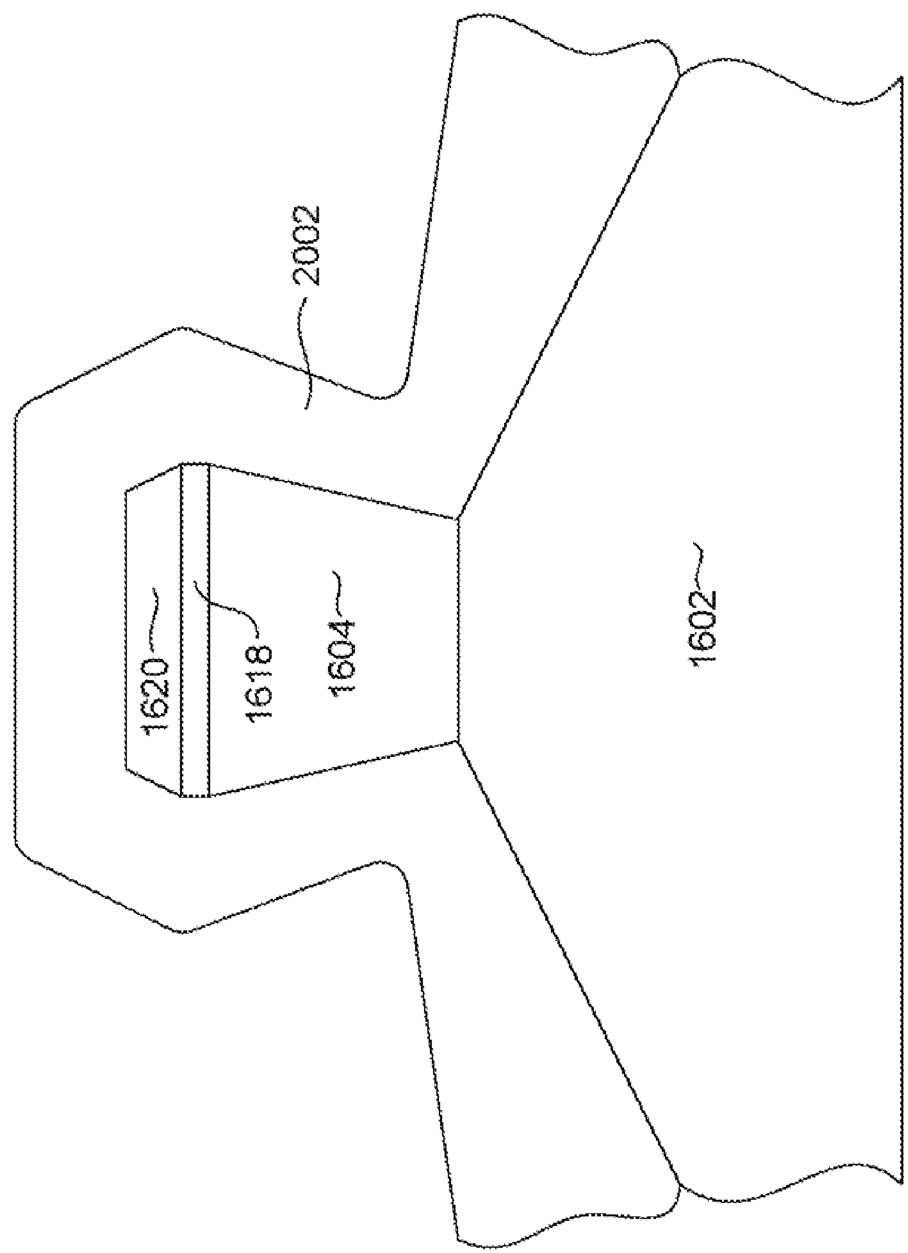
Figure 21:
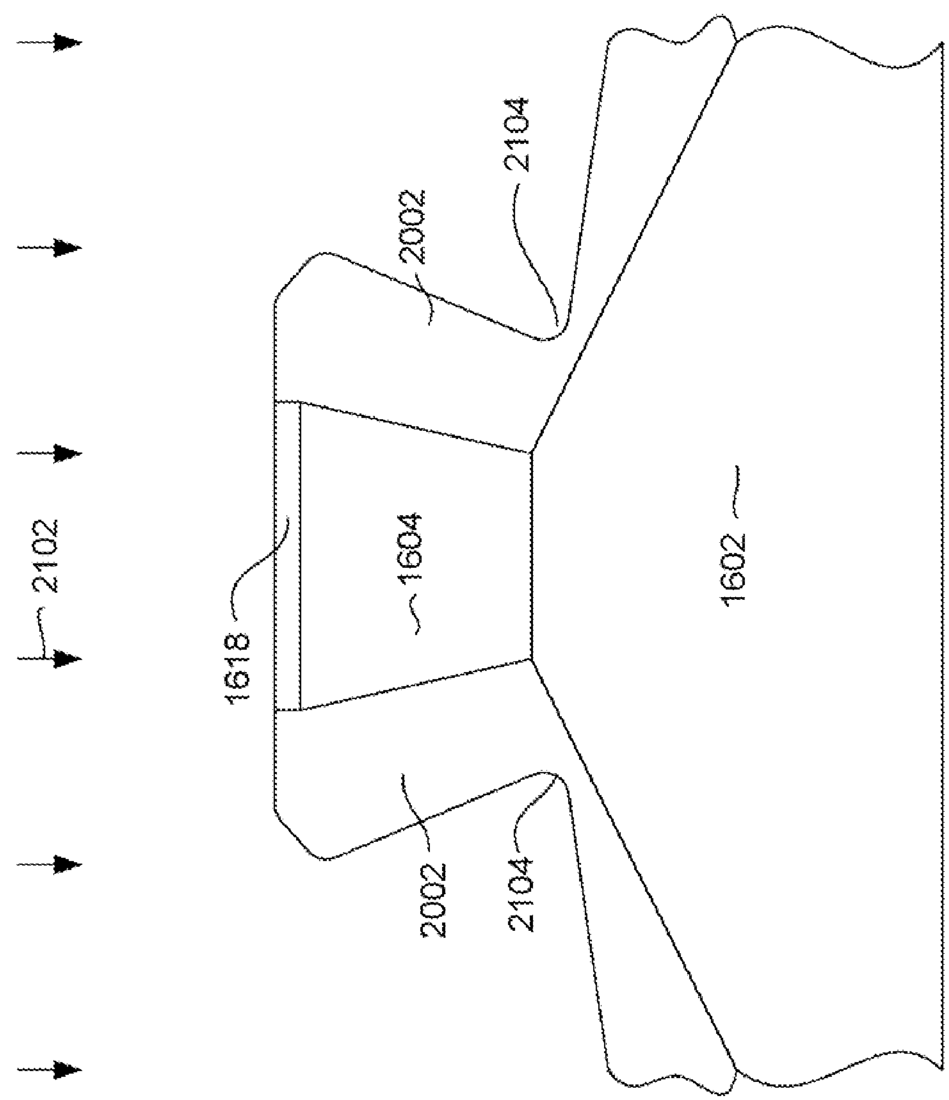

With reference now to FIG. 18 an ion mill can be performed to remove exposed portions of the magnetic layer 1604 to form a write pole. The ion mill 1802 can be performed at one or more angles relative to normal (ie normal to the plane of the materials as deposited and normal to the plane of the wafer (not shown) on which the materials are deposited). This results in a write pole having a desired trapezoidal shape at the pole tip, as shown in FIG. 18. Then, any remaining portions of the image transfer layer 1610 can be removed, such as by a TMAH (Tetramethylammonium hydroxide) etch and strip process, resulting in a structure as shown in FIG. 19. Then, with reference to FIG. 20, a non-magnetic material 2002 is deposited. Although other materials could be used, the layer 2002 is preferably alumina ($Al_2O_3$), and is preferably deposited by a conformal deposition method such as atomic layer deposition, (ALD), or chemical vapor deposition (CVD), etc. With reference to FIG. 21, an Ar ion milling 2102 can be performed to remove a portion of the alumina layer 2002. This is, however, an optional step. If the Ar ion milling is performed, it can be performed with end point detection so that the Ar ion milling can be stopped when the first layer 1618 of the hard mask is reached, after removing the second layer 1620. For example, an endpoint detection method can be performed to detect the presence of Ta or Si, indicating that the layer 1618 has been reached. Not only does the optional Ar ion milling 2102 remove the alumina 2002 and layer 1620 from the top of the pole 1604, it also moves the bottom corners 2104 beneath the bottom, or leading edge, of the write pole 1604 This is desirable for forming a wrap around trailing shield with optimal properties as will be seen.

Figure 22:
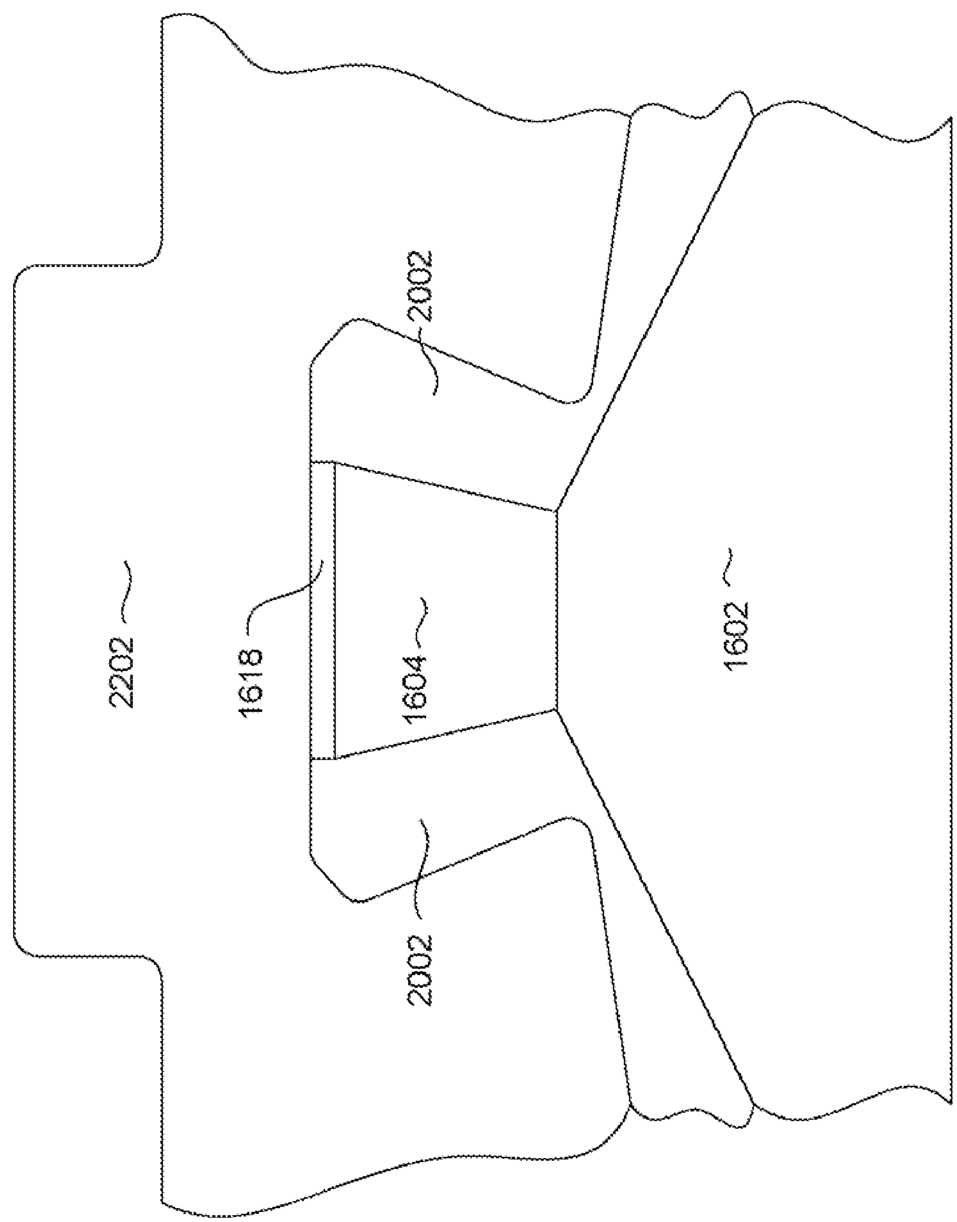

With reference now to FIG. 22, a layer of non-magnetic fill material 2202 is deposited, preferably to a thickness at least as great as the write pole 1604. This non-magnetic fill material can be a polyimide such as DURAMIDE®, photoresist or thermal image resist. This material can then be hard baked. Optionally, the fill material 2202, can also include a thin layer (about 1 um) (not shown) deposited. Such a hard material could be, for example $SiO_2$, SiON, $Ta_2O_5$ or Ta.

Figure 23:
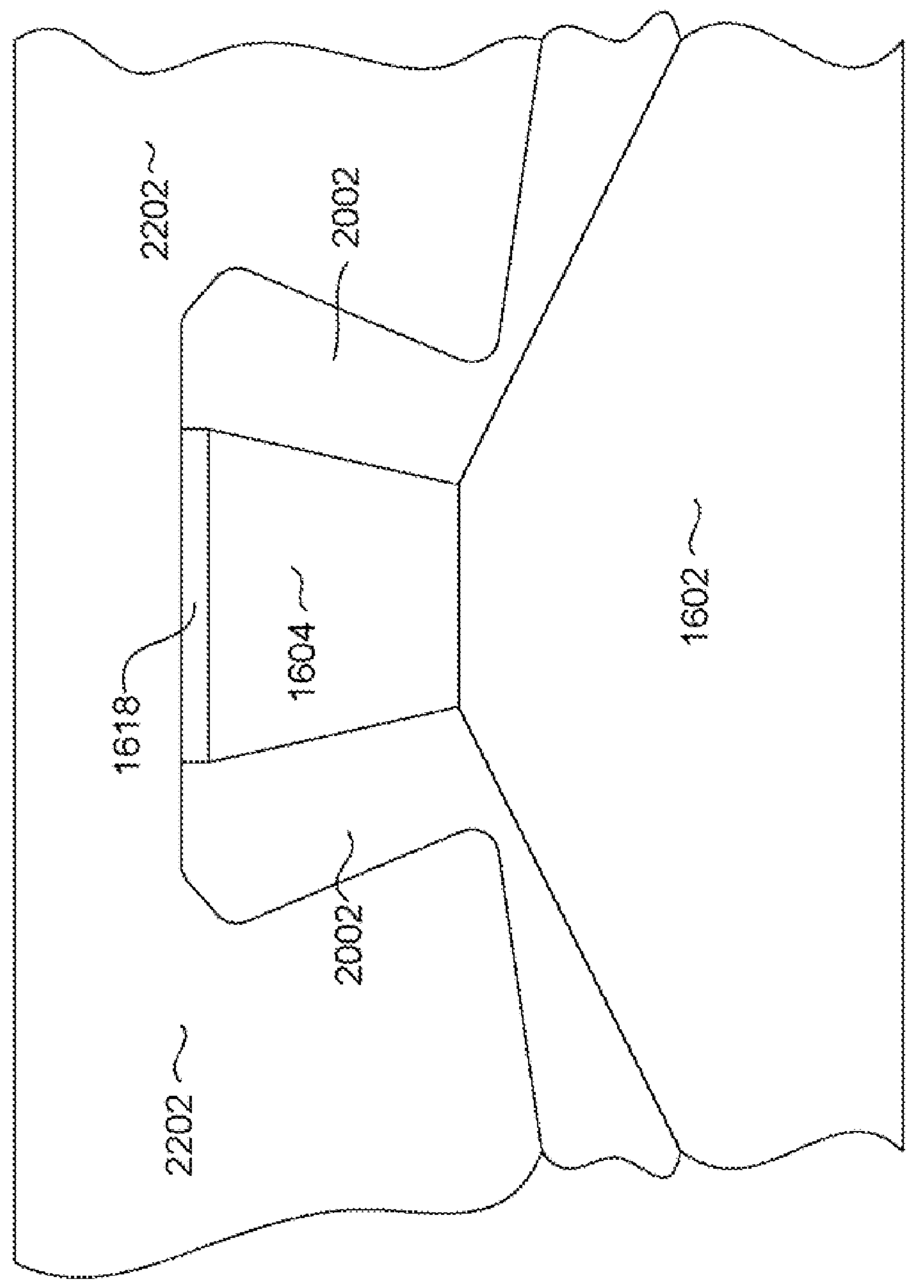
Figure 24:
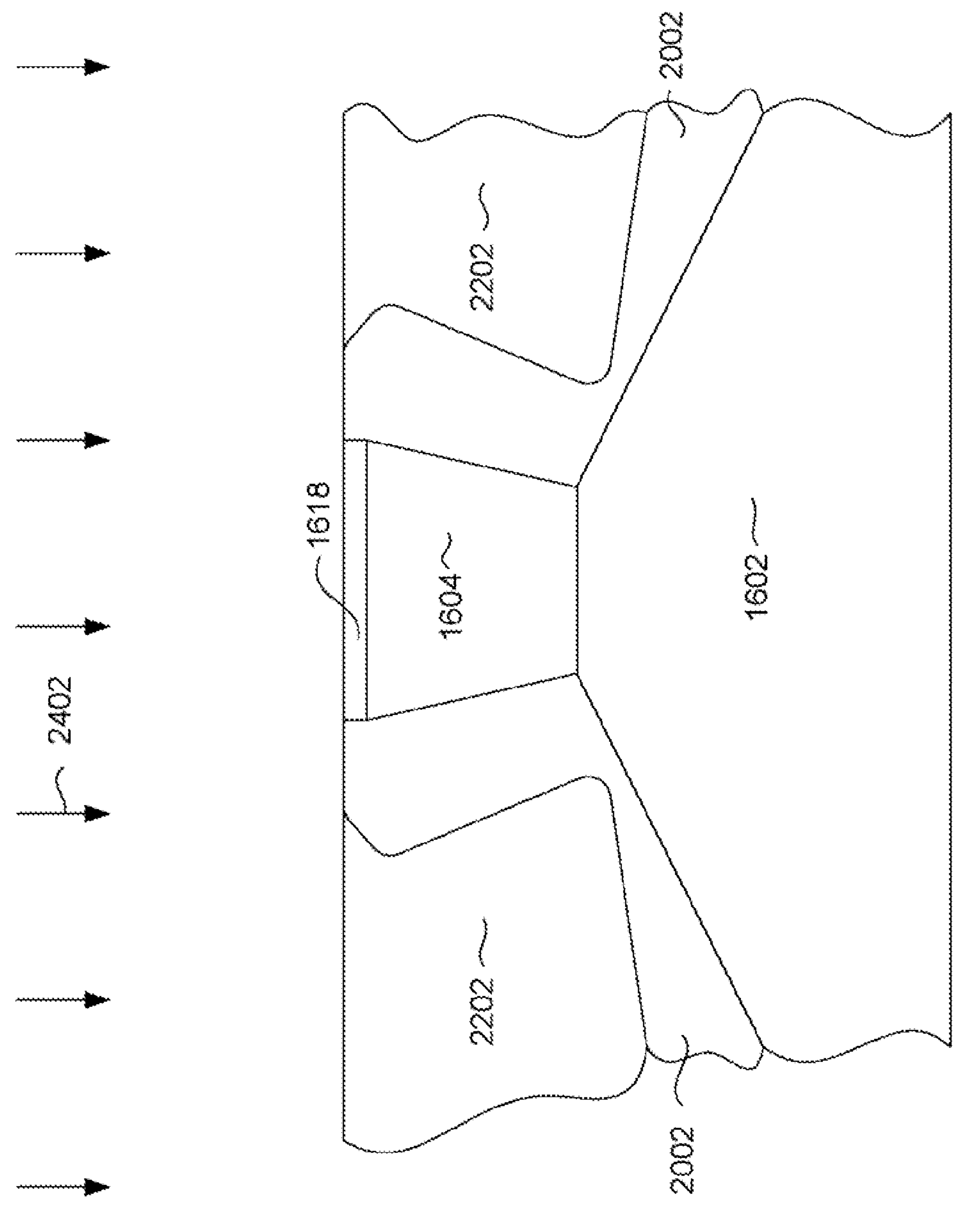

With reference now to FIG. 23, a chemical mechanical polishing process (CMP) can be performed to planarize the surface of the till material 2202. This CMP could be performed so as to leave the fill material 2202 with a surface that is about 0.1 um above the top of the write pole 1604. Then, with reference to FIG. 24, a material removal process 2402 such as reactive ion etching (RIE) or Ar ion milling can be performed to remove the fill material 2202 down to the level of the hard mask layer 1618. This material removal process 2402 can be performed with an end point detection method to detect the presence of Ta or Si, so that the material removal process 2402 can be stopped when the mask layer 1618 has been reached. This material removal process 2402 is, however, optional, since the previous CMP described with reference to FIG. 23 could be performed until the hard mask 1618 has been reached. This would, however, require careful control of the CMP process. Another option is, instead of performing ion milling 2102 in FIG. 21, is to apply the fill material 2202 right after deposition of the alumina layer 2002 as shown in FIG. 20. Then continue processing as in FIGS. 23-24.

Figure 25:
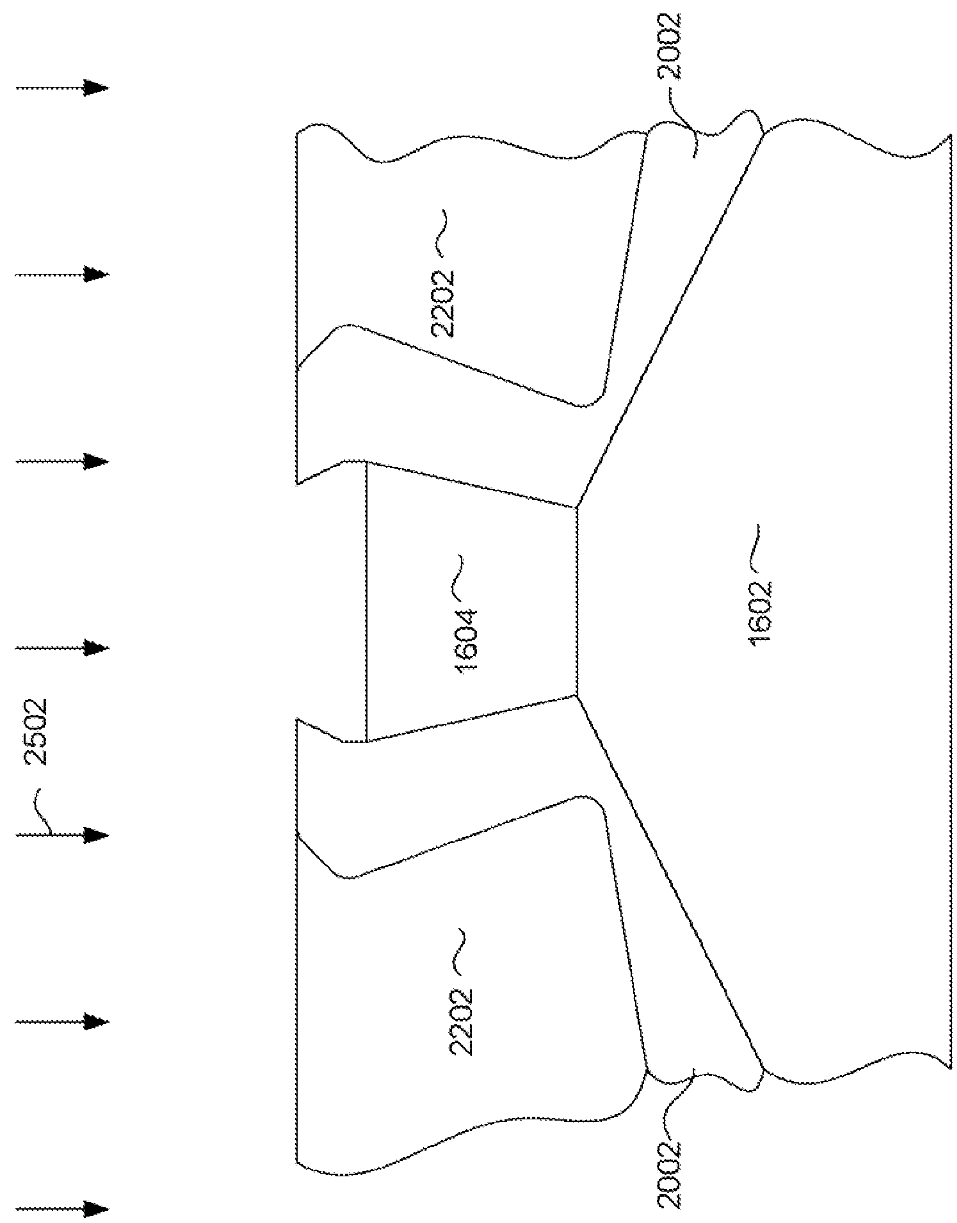
Figure 26:
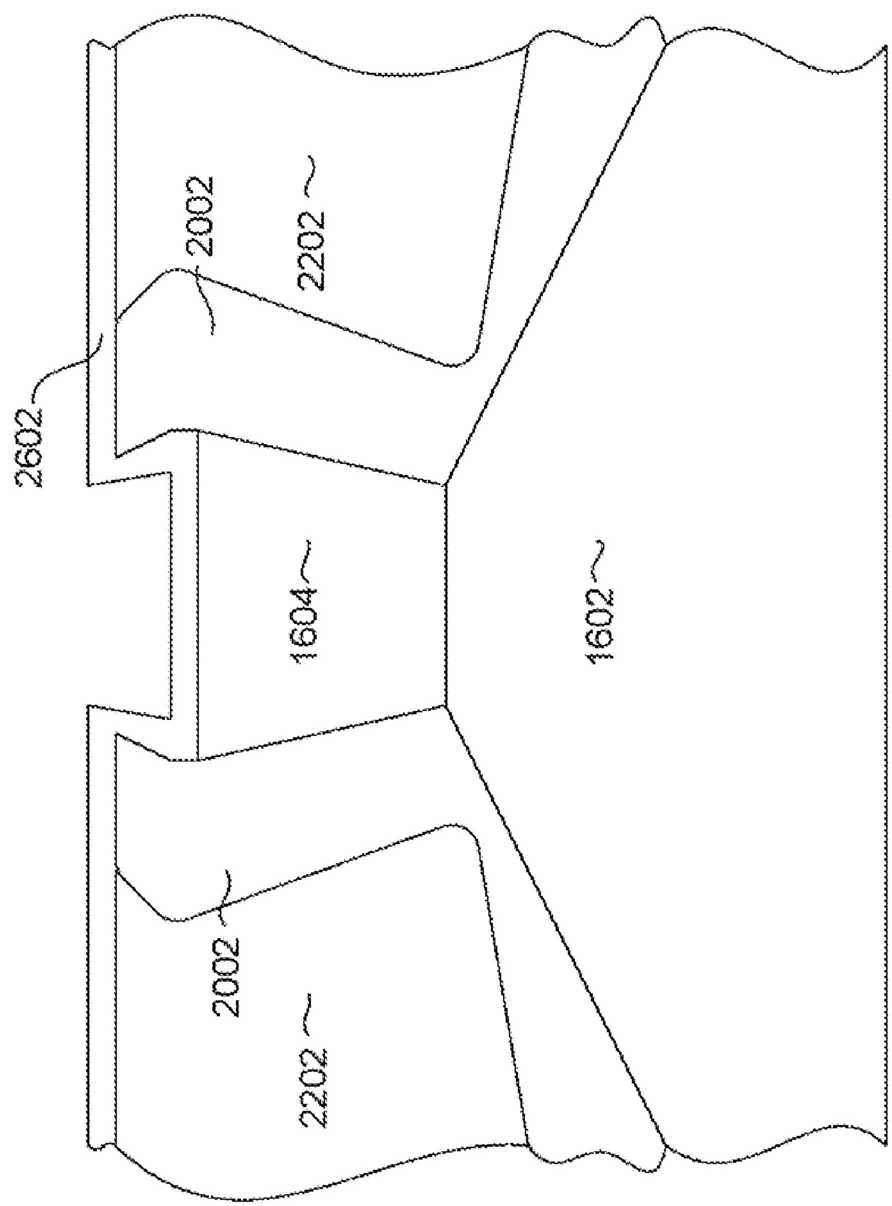
Figure 27:
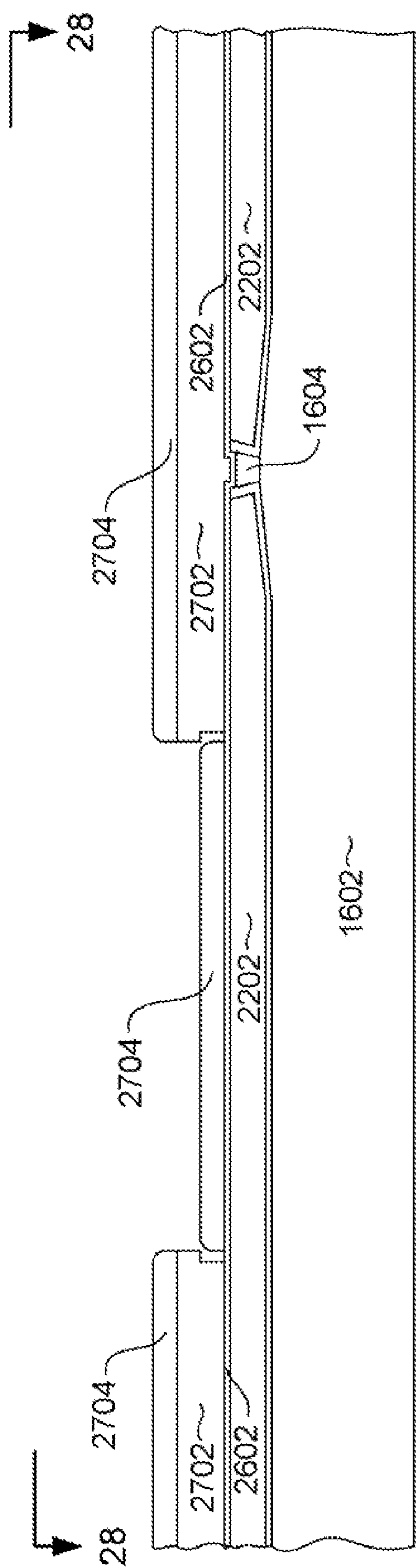

With reference now to FIG. 25, a reactive ion etch (RIE) 2502 can be performed to remove the remaining hard mask 1618 (FIG. 25). Then, with reference to FIG. 26, a layer of electrically conductive, magnetic seed material 2602 is deposited full film. This seed material 2602 can be CoFe and can be deposited to a thickness of 1 to 100 nm. The seed layer 2602 can be deposited by a method such as sputter deposition. Then, as illustrated in FIG. 27, a mask 2702 is formed to have an opening over an area where an electrical lapping guide will be formed. The mask 2702 can be constructed as a bi-layer mask, so that it has an overhanging structure to facilitate lift-off of the mask. The mask 2702 can be constructed of a resist such as photoresist or thermal image resist and can be photolithographically patterned to form the opening where the lapping guide will be formed. Then, ion milling will remove the seed material 2602 in opening area followed by depositing an electrically conductive material 2704, like Rh, or Ir, W, Ru, An, etc. is deposited, such as by sputter deposition. The mask 2702, can then be chemically lifted off, leaving material 2704 (eg. Rh) only over the area where the electrical lapping guide will be located.

Figure 28:
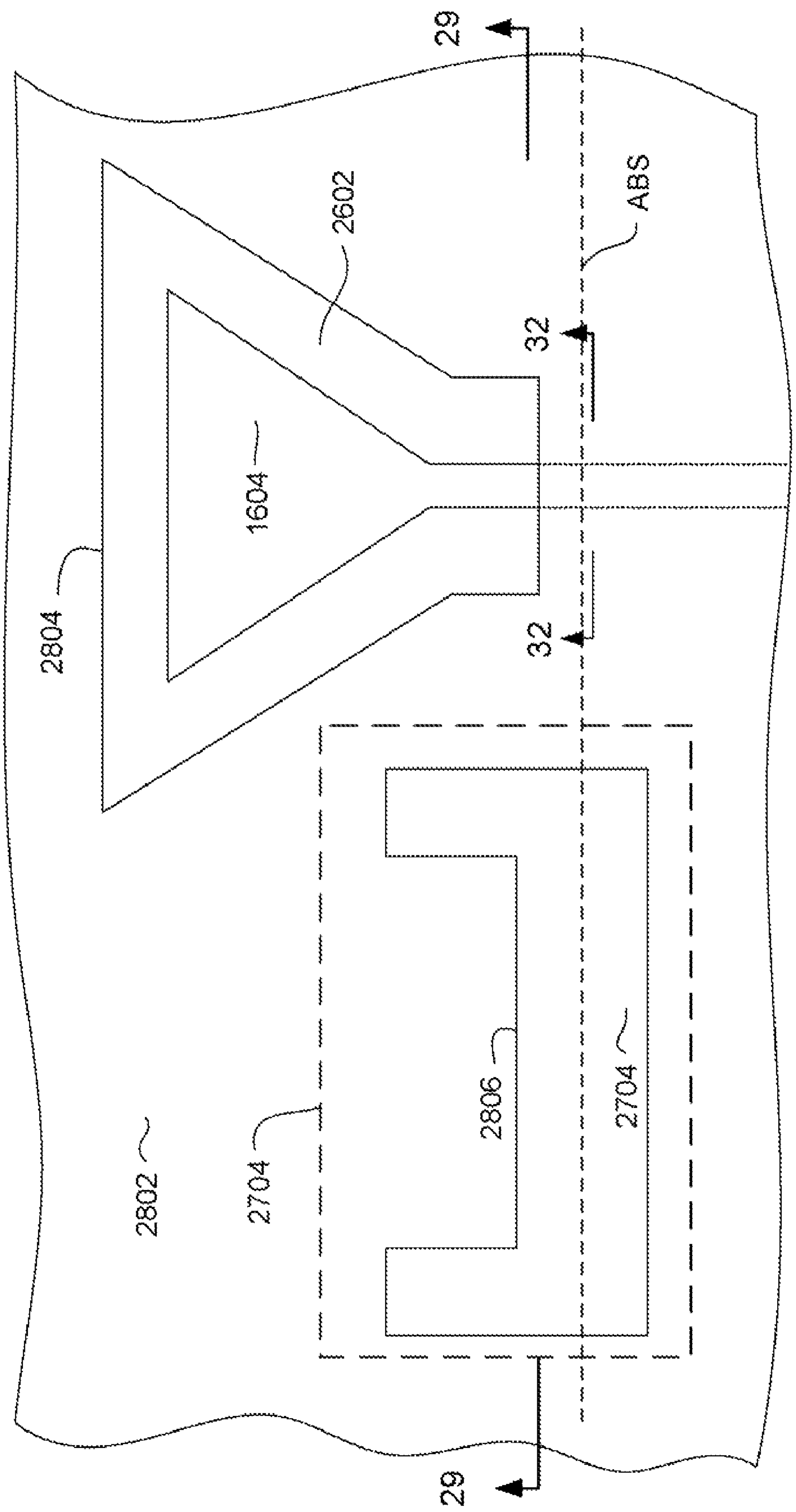

With reference now to FIG. 28, which shows a top down view of the write pole area and electrical lapping guide area, a mask 2802, such as a photoresist, or thermal image resist mask, is formed. The mask 2802 has an opening 2804 over the write pole area, configured to define a stitched flare structure. The mask has another opening 2806 that is configured to define an electrical lapping guide. Portions of the underlying write pole 1604 that are hidden beneath the mask 2802 are shown as a dotted line In FIG. 28. The location of an intended air bearing surface is indicated by a dashed line denoted as (ABS). The mask 2802 can be formed by spinning a layer of resist such as photoresist or thermal image resist, and then photolithographically patterning and developing the resist layer. As can be seen, the stitched flare structure and the electrical lapping are advantageously defined in the same photo step. This allows the stitched flare structure and lapping guide to be very accurately aligned, as will become clearer below.

Figure 29:
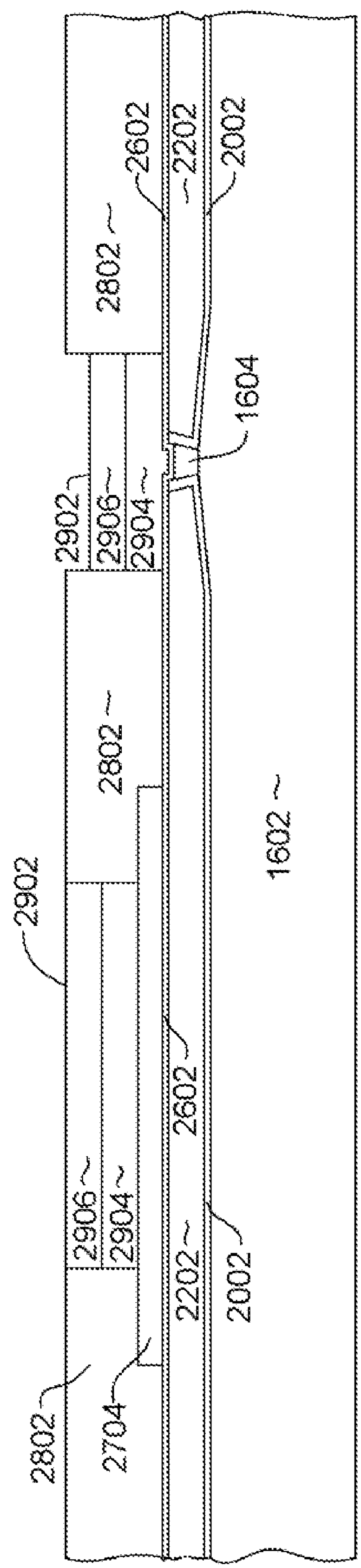
Figure 30:
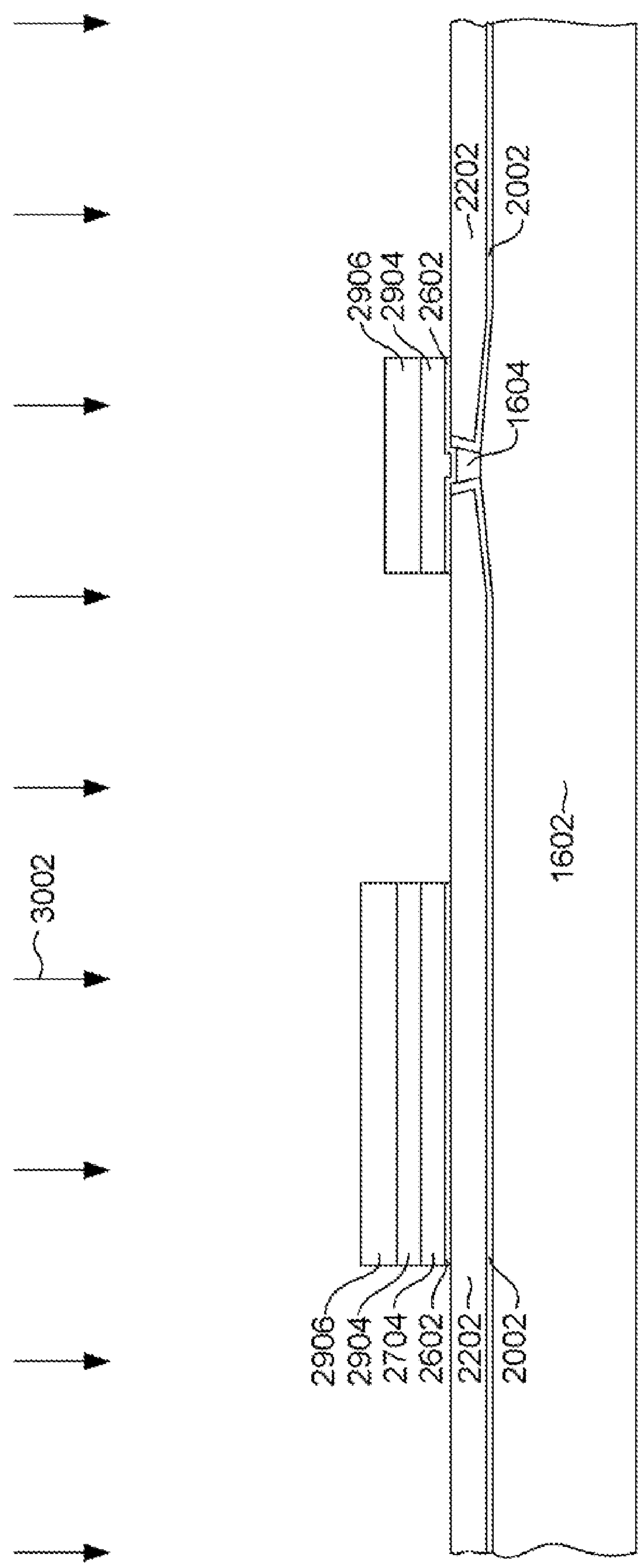

With reference now to FIG. 29, a magnetic material 2902 is electrically plated into the openings 2804, 2806 in the mask 2802. The magnetic material can include a first layer 2904 of NiFe such as $Ni_{45}Fe_{55}$ and a second layer 2906 of NiP or any other non-magnetic material formed over the first layer 2904. Then, with reference to FIG. 30, the mask 2802 is lifted off, and an ion mill (or other suitable material removal process) 3002 is performed to remove portions of the Rh seed 2704 that are not covered by the magnetic material 2904, 2906 in the area of the lapping guide. In this way, the magnetic layers 2904, 2906 act as a mask to transfer their image onto the underlying Rh layer 2704. The magnetic materials 2904, 2906 over the write pole 1604 form a stitched flare structure 3004.

Figure 31:
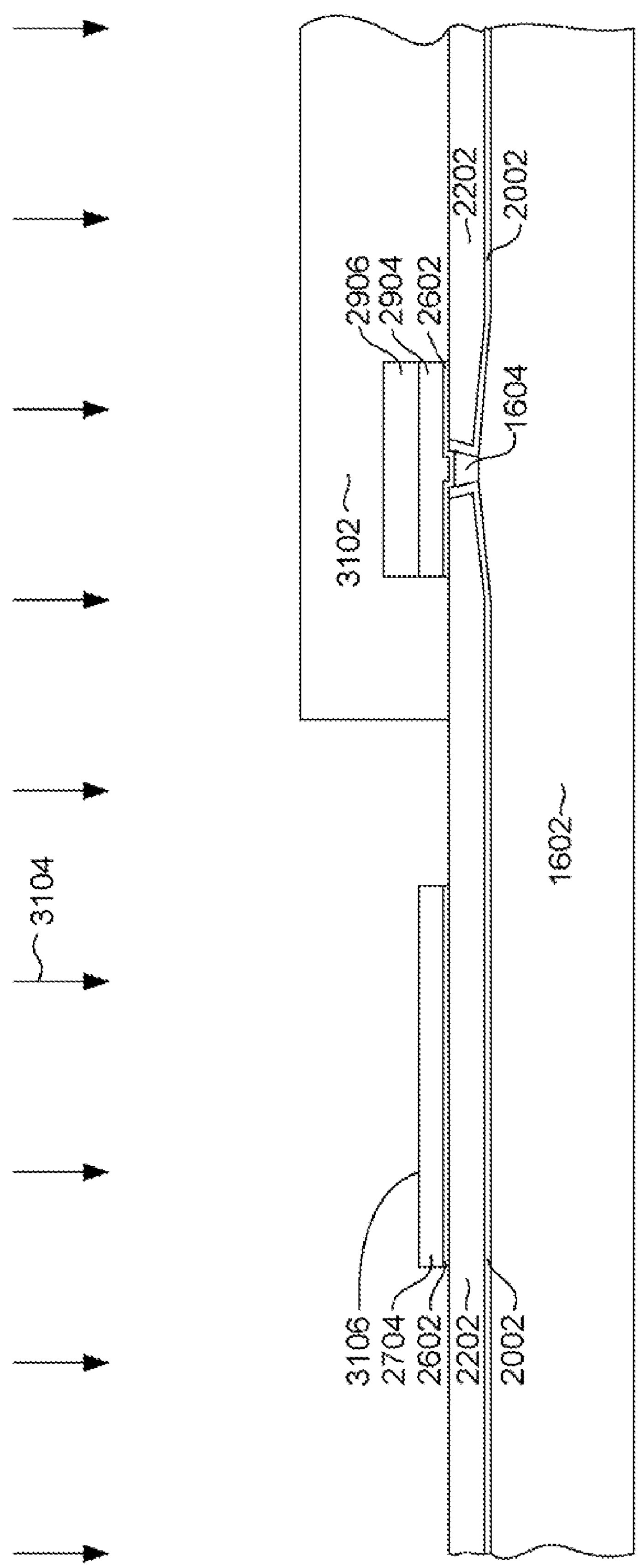

With reference now to FIG. 31, another mask 3102, such as a resist mask is formed so as to cover the area of the write pole and stitched flare structure 3004. Then, a material removal process such as an etching process is performed to remove the layers 2904, 2906 from the area over the Rh layer 2704. The remaining Rh layer 2704 then form an electronic lapping guide 3106. After the magnetic material 2904, 2906 has been removed from the area over the Rh layer 2704, the mask 3102 can be lifted off, such as by a chemical liftoff process.

Figure 32:
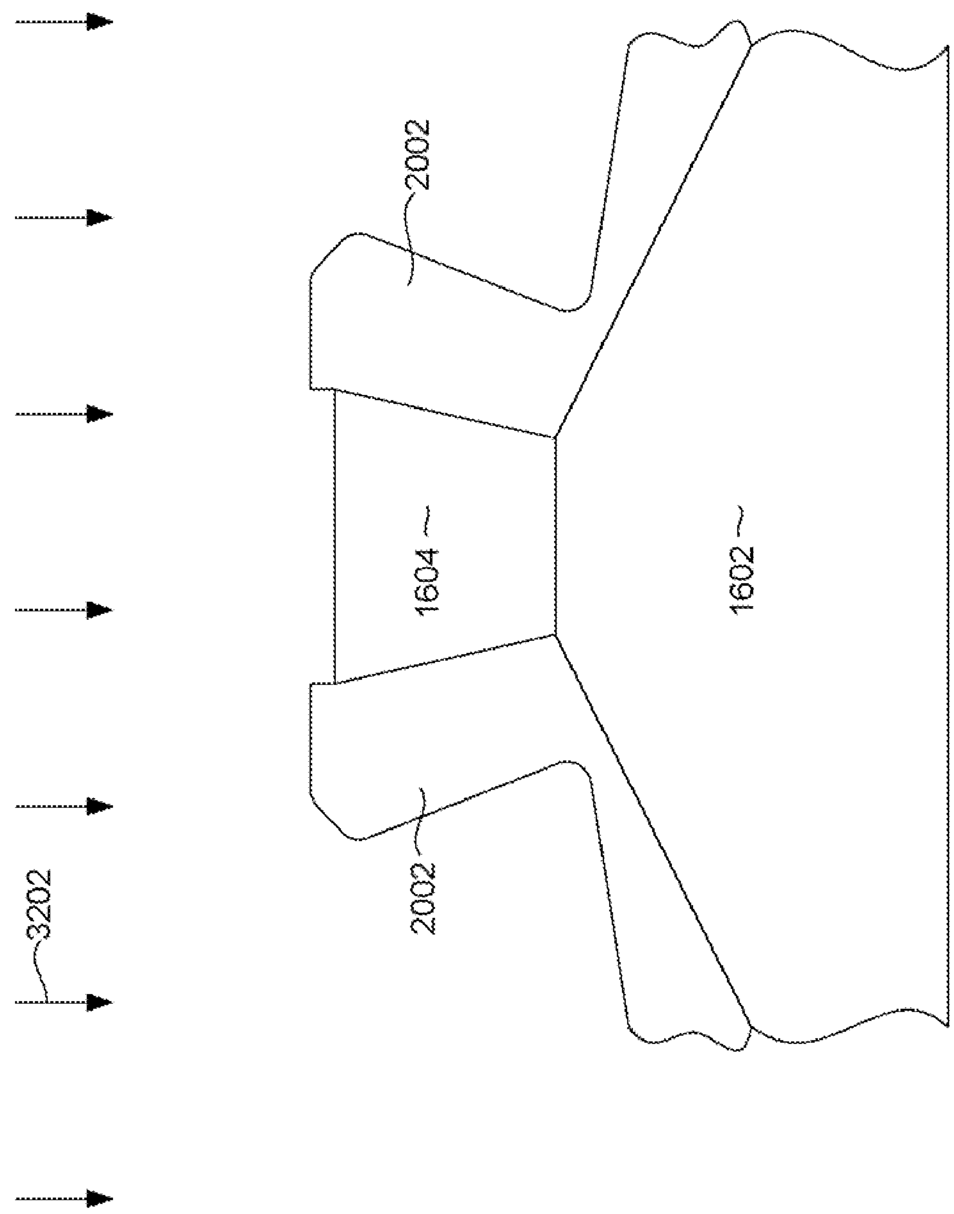
Figure 33:
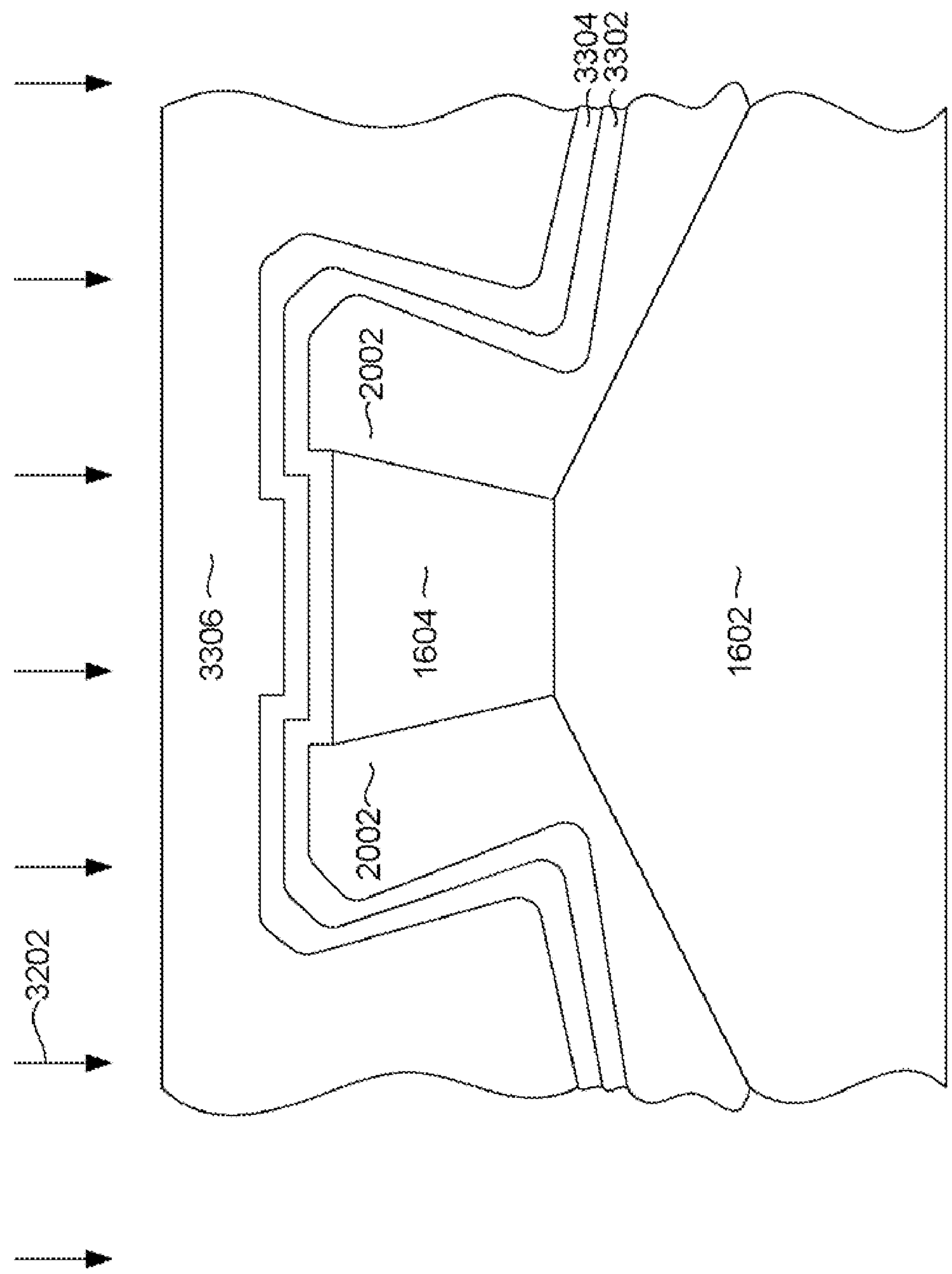

Now, with reference to FIG. 32, a reactive ion etch RIE 3202 can be performed to remove the fill layer 2202 (eg. hard-baked resist, DURAMIDE, SiN, SiON, $SiO_2$ or TaO). Then, with reference to FIG. 33, a non-magnetic material 3302 is deposited to a thickness to form a desired trailing shield gap. Then, a magnetic, electrically conductive seed layer 3304 such as NiFe or CoFe is deposited followed by an electroplated magnetic material 3306 such as NiFe or CoFe to form a trailing shield that wraps around the write head. As can be seen, the trailing shield (magnetic layers 3304, 3306) is separated from the sides of the write pole 1604 by side gaps that are larger than the trailing gap formed by the non-magnetic layer 3302 at the trailing edge of the write pole 1604. By building wrap around shield against the plated stitched flare structure, the shield throat height is essentially tied together with the flare point or self-aligned, to the flare point. This will allow both flare point and shield throat height to be controlled tightly by lapping to the electrical lapping guide.

Use of Marker to Monitor Flare Point Variation:

With reference now to FIGS. 34-45, a process is described that allows the location of the flare point to be carefully monitored in spite of process variations that dynamically affect the flare point location. Many parameters affect the location of the flare point during manufacture. What's more, many of the processes used to form the write pole affect the flare point location differently than they affect the relevant edges of a lapping guide. For example, a reactive ion etch process used to define a mask structure for the write head and also for other steps in the construction of the write head causes the flare point to move backward away from the air bearing surface (ABS), while at the same time causing the back edge of the lapping guide to move forward, toward the ABS. Similarly, the ion milling process used to form the write pole causes the flare point to move backward, away from the ABS, while also causing the back edge of the lapping guide to move forward, toward the ABS. Therefore, the locations of the flare point and lapping guide are not static relative to one another, but actually move in different directions during manufacture. The present invention provides a way to monitor the variation of the relative locations of the write pole flare point and lapping guide critical dimensions relative to one another, so that an accurate determination of ABS location relative to flare point can be made during lapping.

Figure 34:
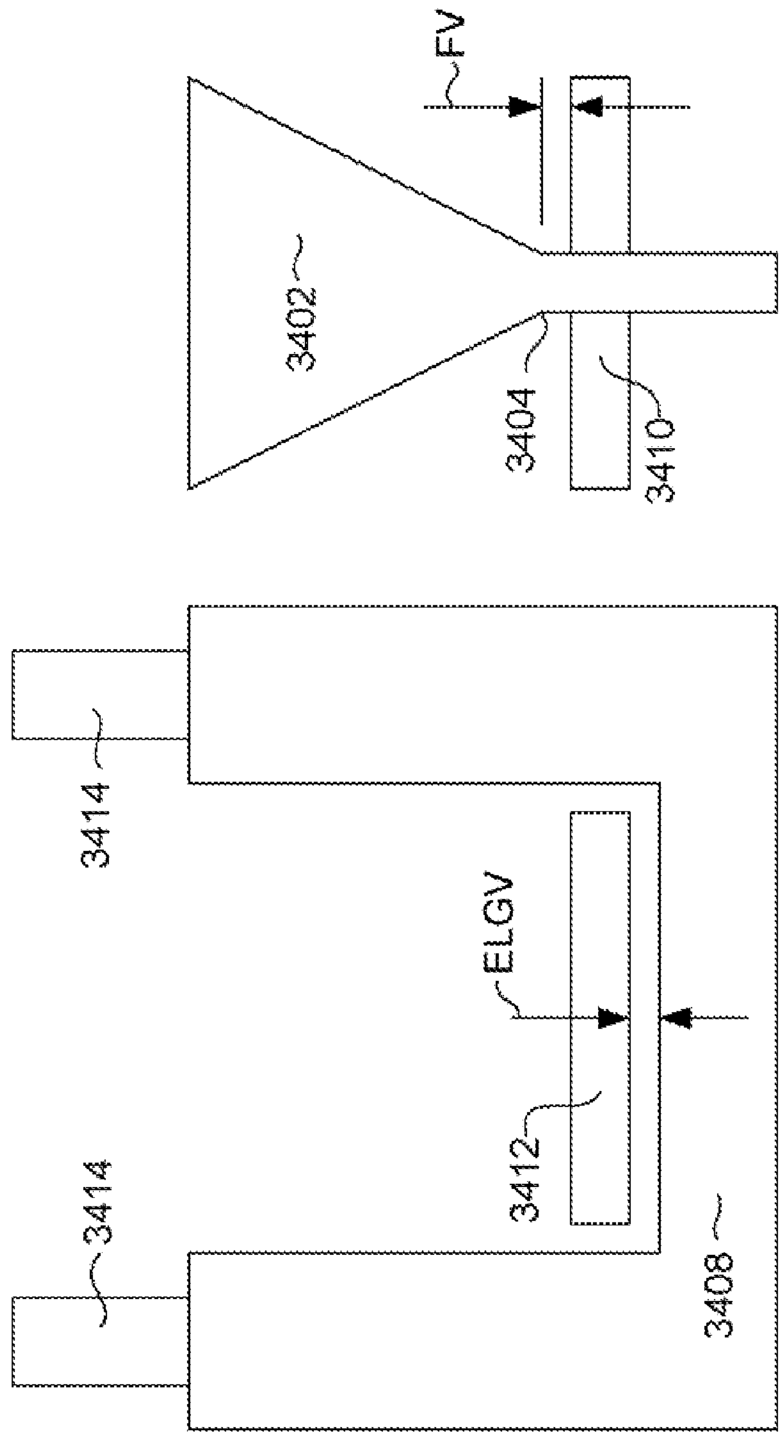
FIG. 34 is a top down view illustrating a magnetic write head and electrical lapping guide according to another embodiment of the invention.

With reference to FIG. 34, in an embodiment of the invention, a write pole structure 3402 is provided, having a flare point 3404. An electrical lapping guide 3408 is also provided. In addition to these structures, the present embodiment of the invention includes a write pole flare point marker 3410, formed beneath the write pole 3402. The present embodiment also includes an electrical lapping guide marker (ELG marker) 3412, formed beneath the electrical lapping guide (ELG) 3408. Electrically conductive contact pads 3414 may also be fabricated beneath the ELG 3408 to facilitate the electrical connection of the ELG 3408, and may be built in the same build elevation as the markers 3412, 3410. The flare point 3404 of the write head is separated from the flare point marker 3410 by a flare point variation distance (FV), and the back edge of the ELG 3408 is separated from the ELG marker 3412 by an ELG variation (ELGV).

The write pole 3402 can be constructed of a magnetic material such as NiFe or CoFe, and is preferably a laminated structure including layers of magnetic material separated by thin non-magnetic layers. The markers 3410, 3412 can be constructed of various materials and are preferably constructed of a material that is readily visible. For example, the marker layer 3410, 3412 can be formed during main pole shaping layer process, which is prior to main pole process. The markers 3410, 3412 will be used as a common reference to calculate offset between back edge of ELG 3408 and flare point 3404.

Figure 35:
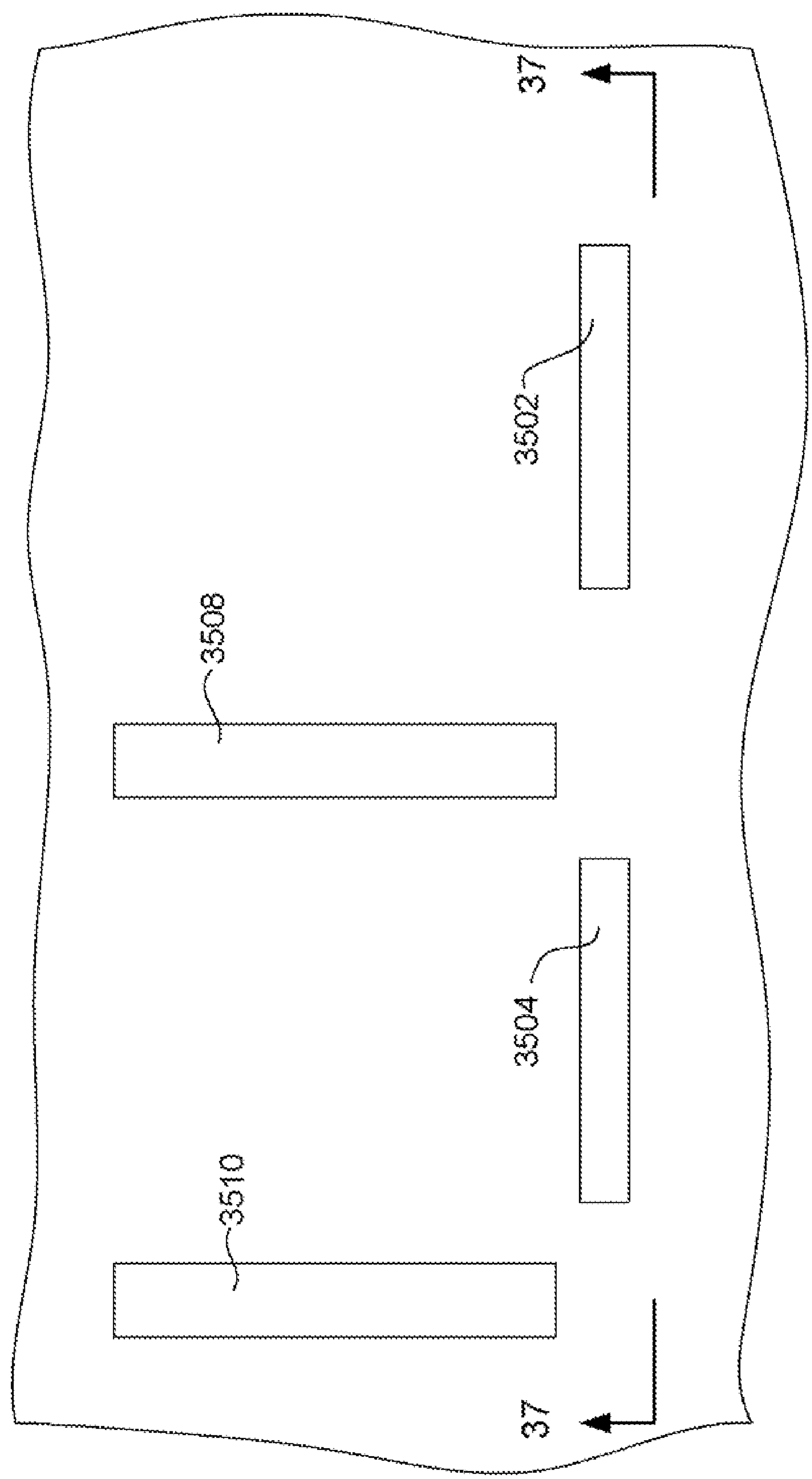
FIGS. 35-45 are show a magnetic write head in various intermediate stages of manufacture illustrating a method of manufacturing a magnetic, write head according another embodiment of the invention.
Figure 36:
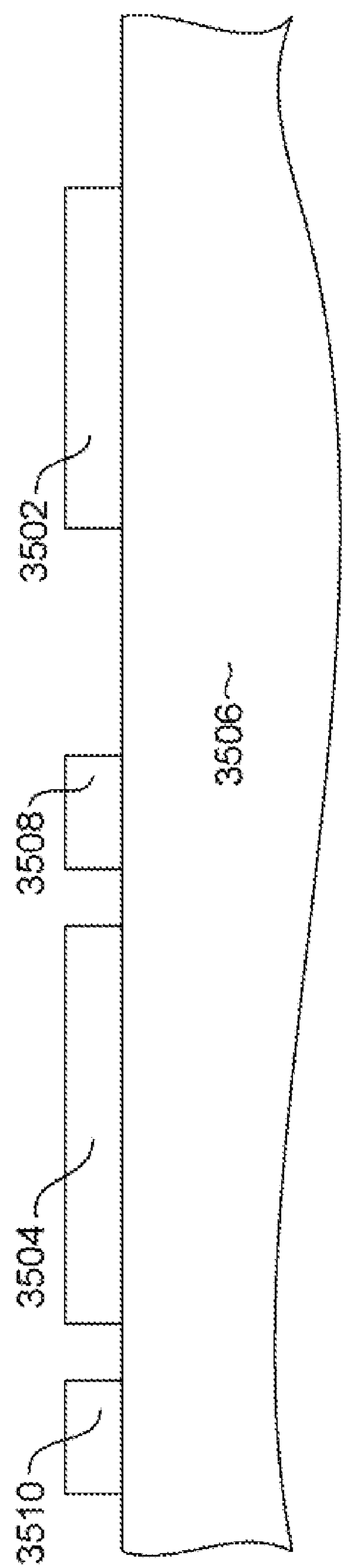

With reference now to FIGS. 35-45, a method of constructing a write pole using markers is described. With particular reference to FIGS. 35 and 36, a pair of markers 3502, 3504 are patterned and deposited on a substrate 3506. The substrate 3506 can be, for example, alumina ($Al_2O_3$) or some other material or combination of materials. A pair of contact pads 3508, 3510 can be formed in the same patterning and deposition step as the markers 3502, 3504. The resist mask can then be lifted off, leaving the markers 3502, 3504 and contact pads 3508, 3510.

Figure 37:
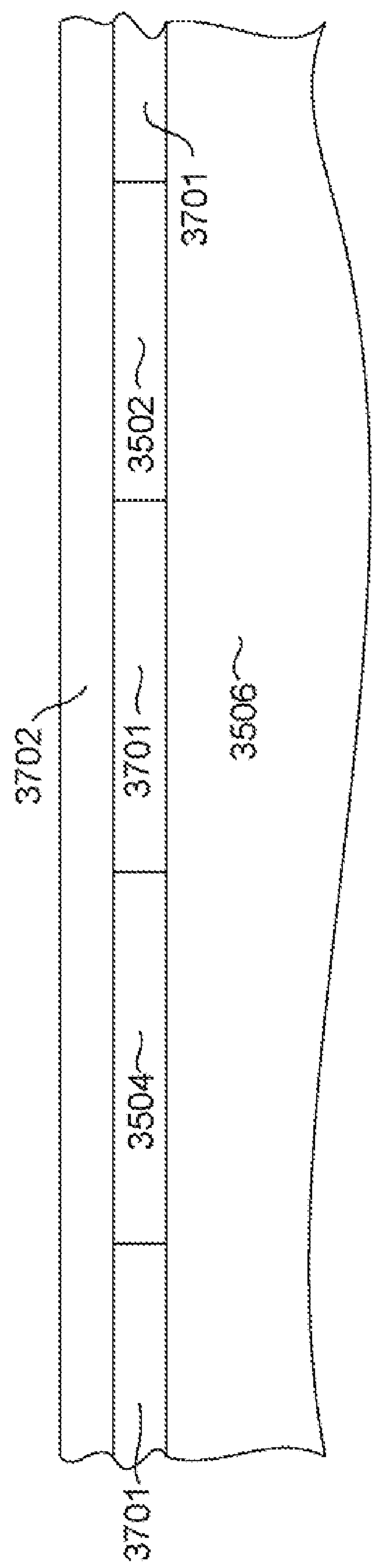
Figure 38:
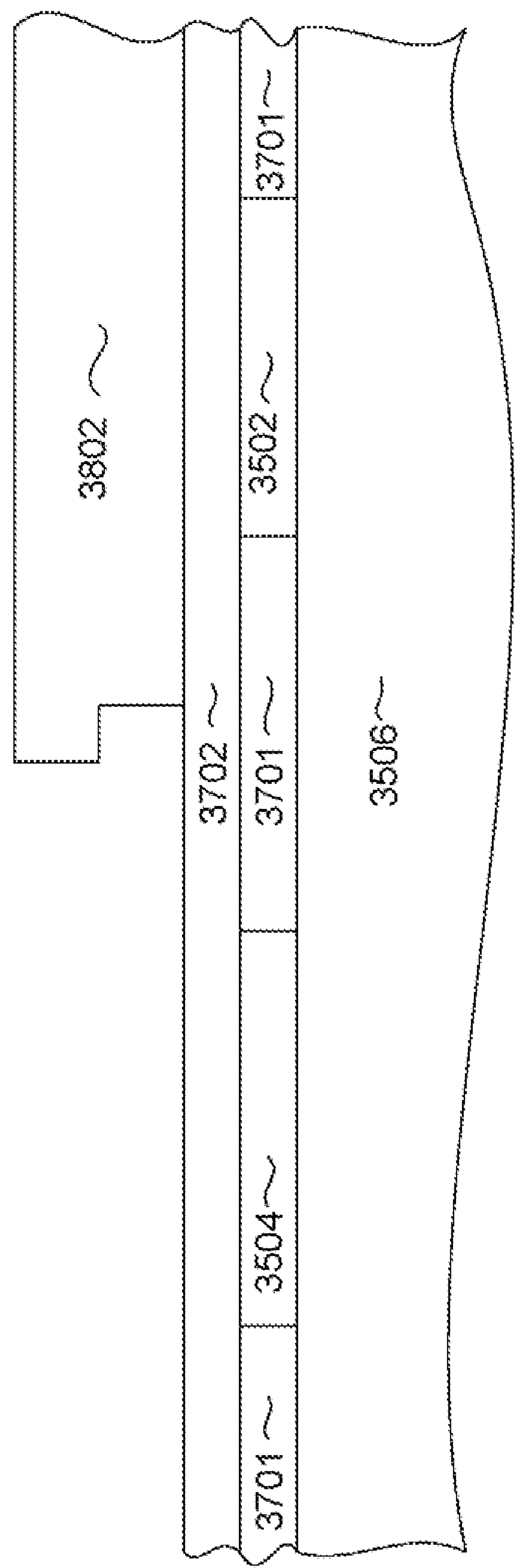
Figure 39:
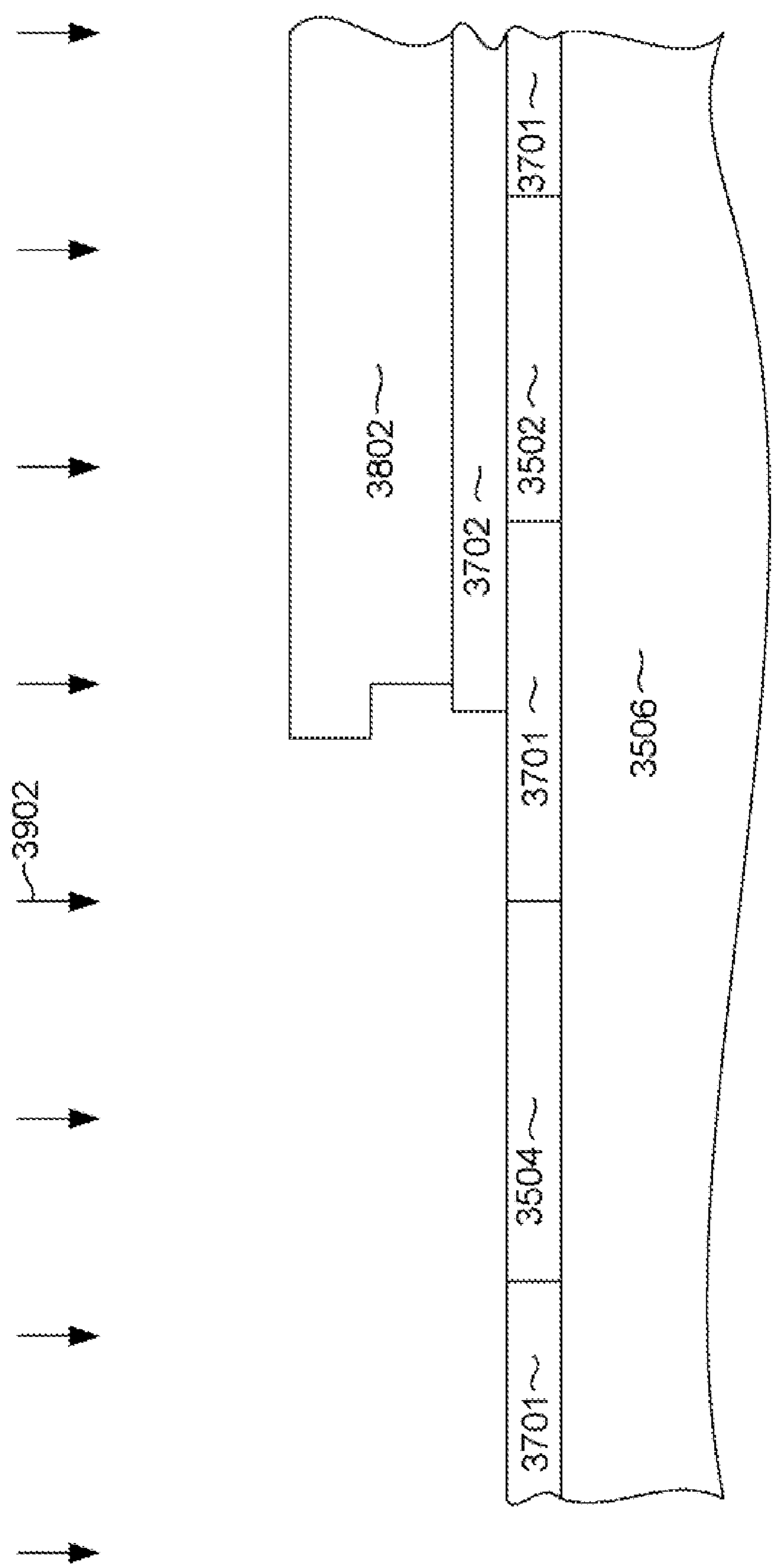

Then, with reference to FIG. 37, an alumina fill layer 3701 is deposited and planarized by chemical mechanical polishing (CMP) until the contact pads are reached. Then, a layer of magnetic material 3702 is deposited. This magnetic material 3702 is preferably a lamination of layers of magnetic material such as NiFe or CoFe separated by thin layers of non-magnetic material Then, with reference to FIG. 38, a mask, preferably a bi-layer photoresist mask, is formed so as to cover the area over the write pole 3502, while leaving the area over the marker 3504 uncovered. With reference now to FIG. 39, a material removal process 3902 such as ion milling is performed to preferentially remove portions of the magnetic laminate film 3702 that are not protected by the mask 3802, while leaving the marker 3504 and contacts intact 3508, 3510. It should be pointed out that the reason that the contacts 3508, 3510 are not shown in FIGS. 37-45 is that they are hidden behind the alumina fill layer 3701 in those views. Once the laminate film 3802 is removed from that region they can once again be seen in the view shown in FIG. 39.

Figure 40:
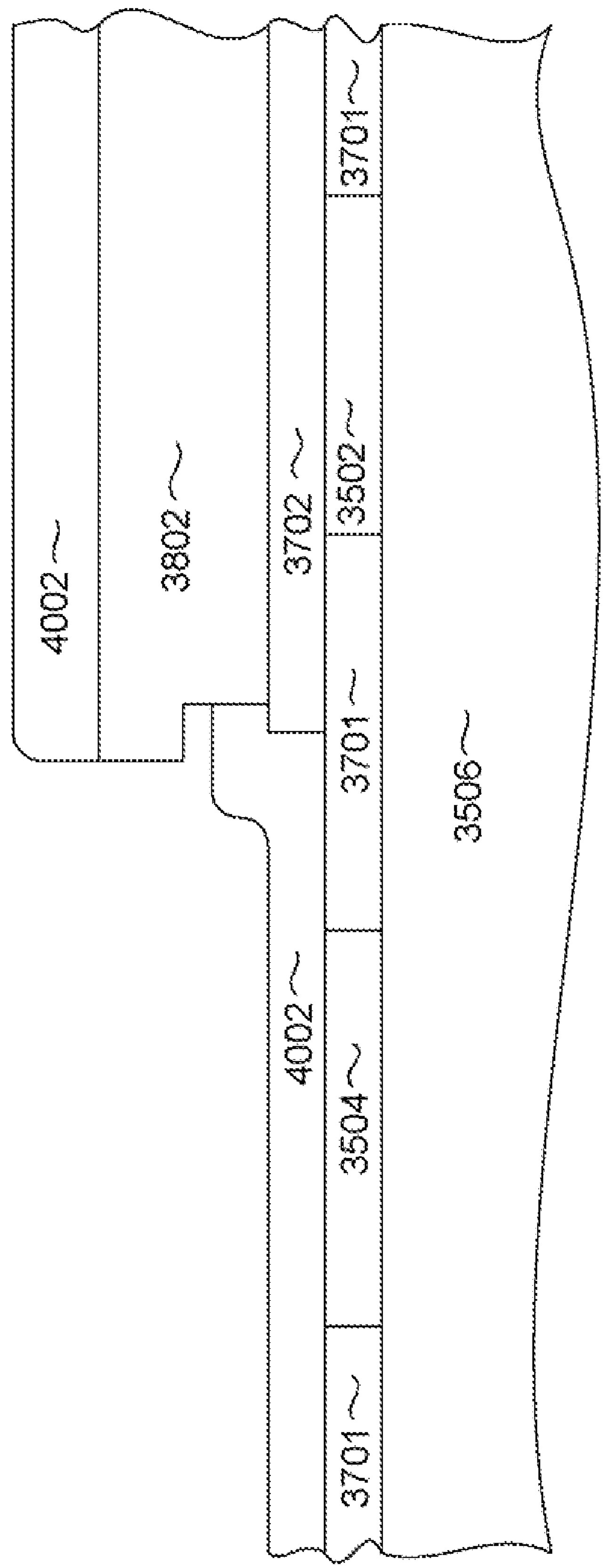
Figure 41:
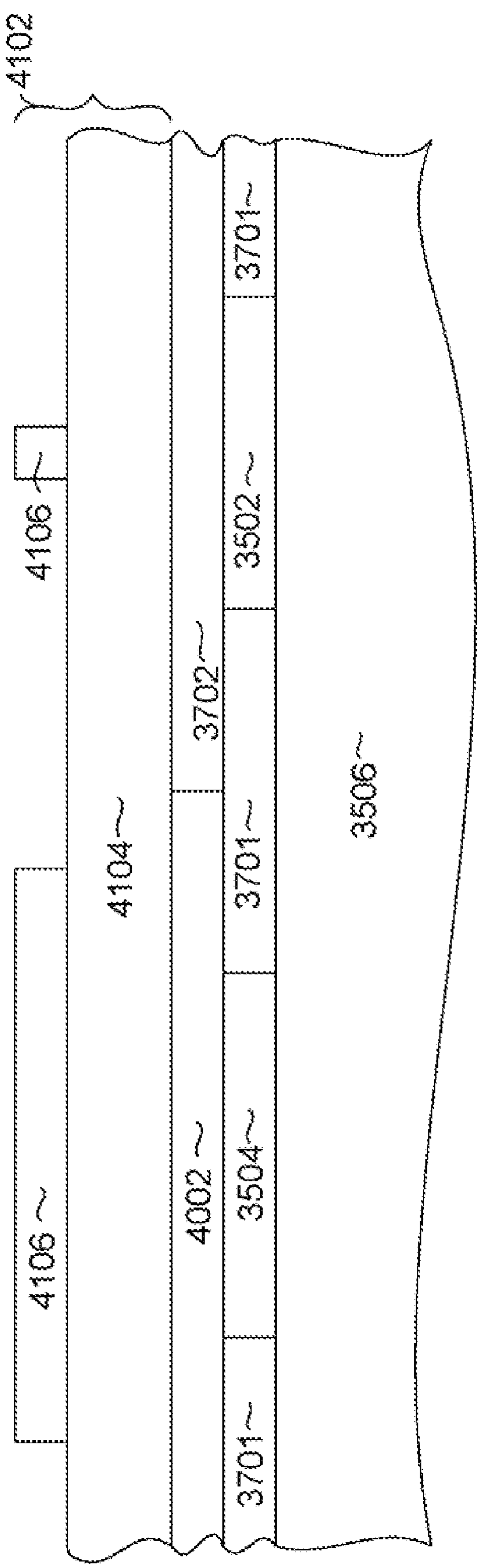
Figure 42:
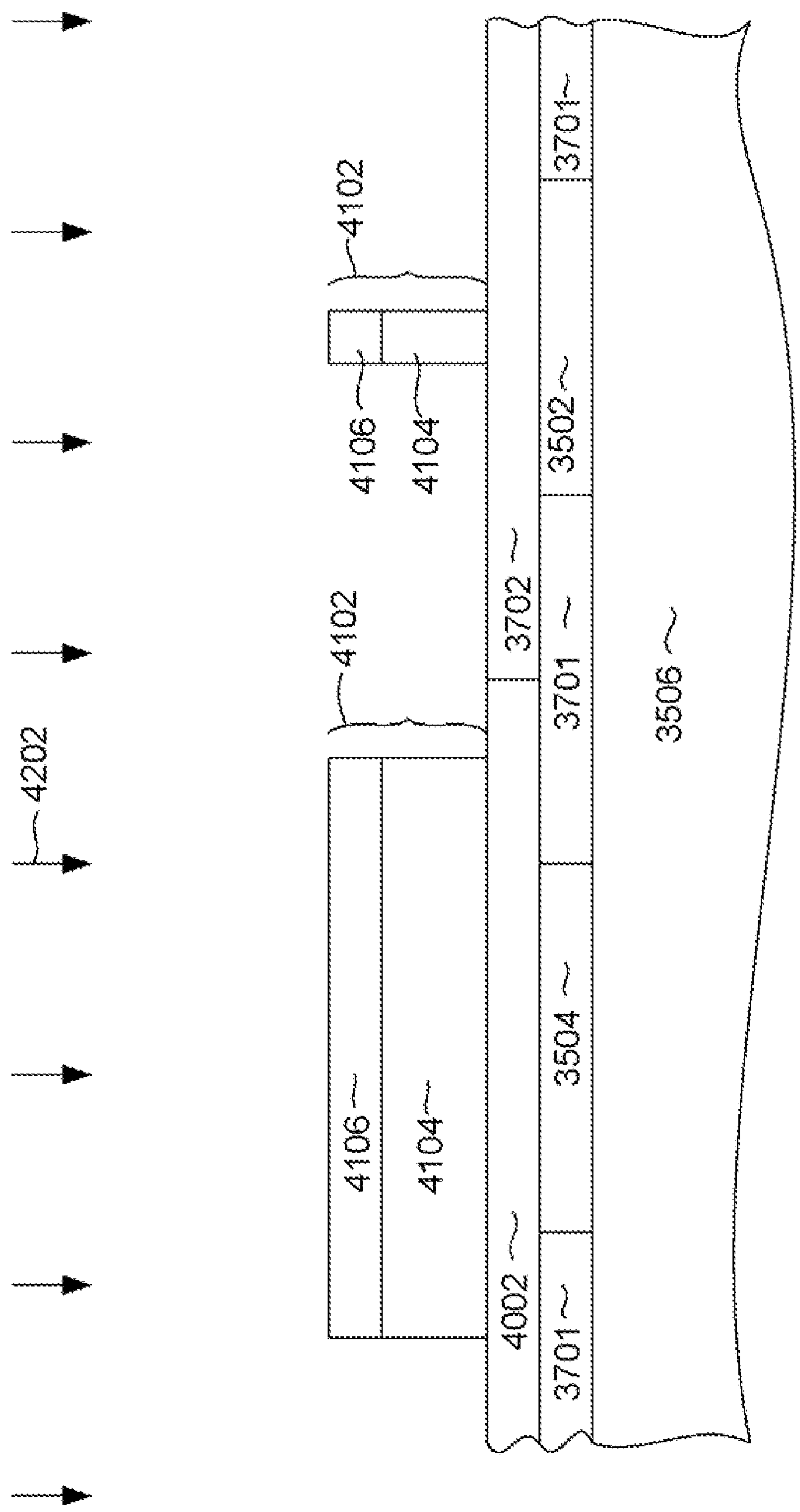
Figure 43:
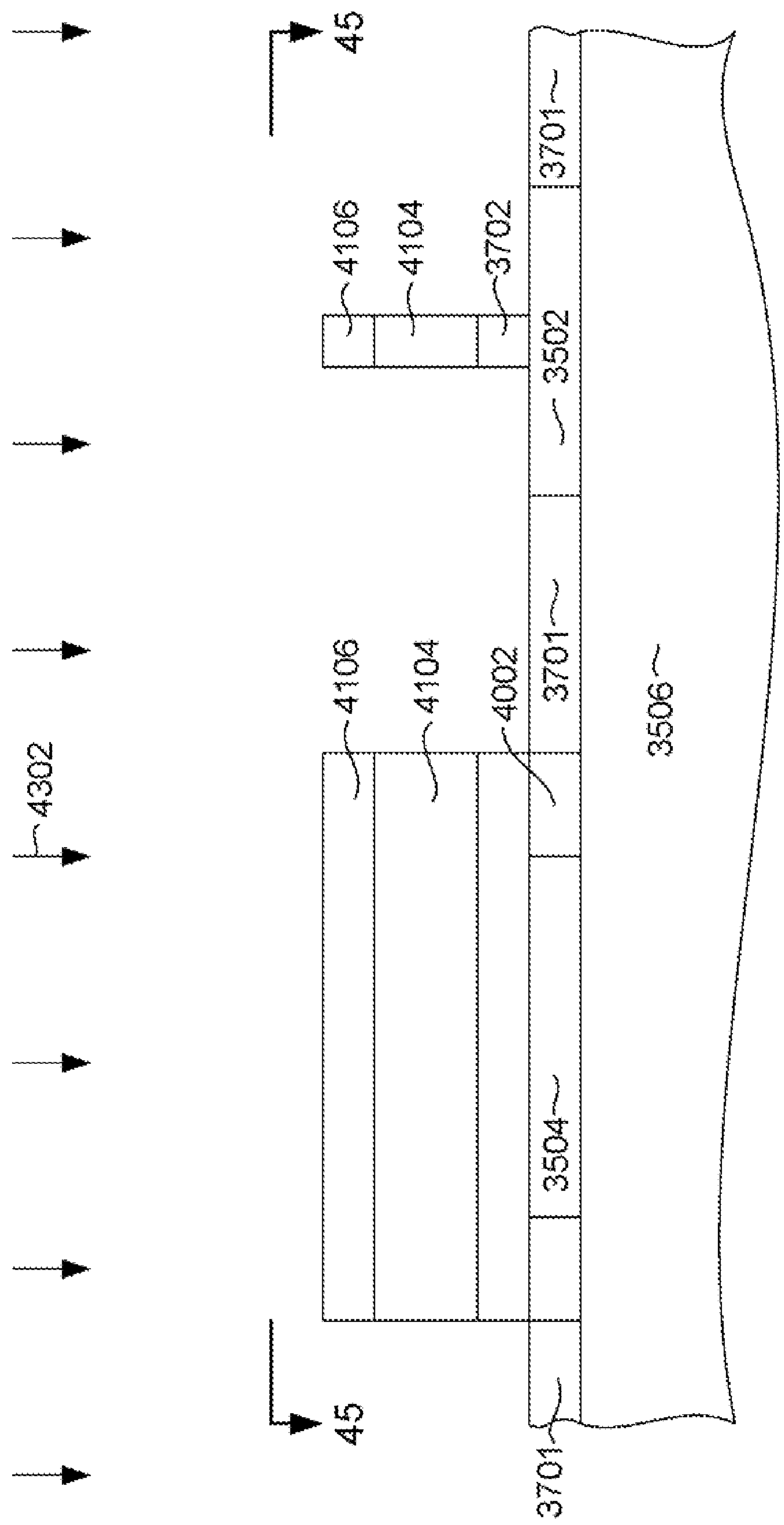

Then, with reference to FIG. 40 with the bi-layer mask 3802 still in place, a non-magnetic metal 4002 such as Ir, Rh, NiCr, Au, W, Ta etc. is deposited full film. Again, the contacts 3508, 3510 are hidden behind this non-magnetic metal layer 4002. The bi-layer mask 3802 can then he lifted off, leaving the magnetic laminate layer 3702 in the write pole region, and a layer of non-magnetic metal 4002 in the ELG region. Starting from here, a main pole process can be performed same as described in FIG. 16 to FIG. 19. The only difference is that a resist pattern 1616 also will include ELG structure.

Figure 44:
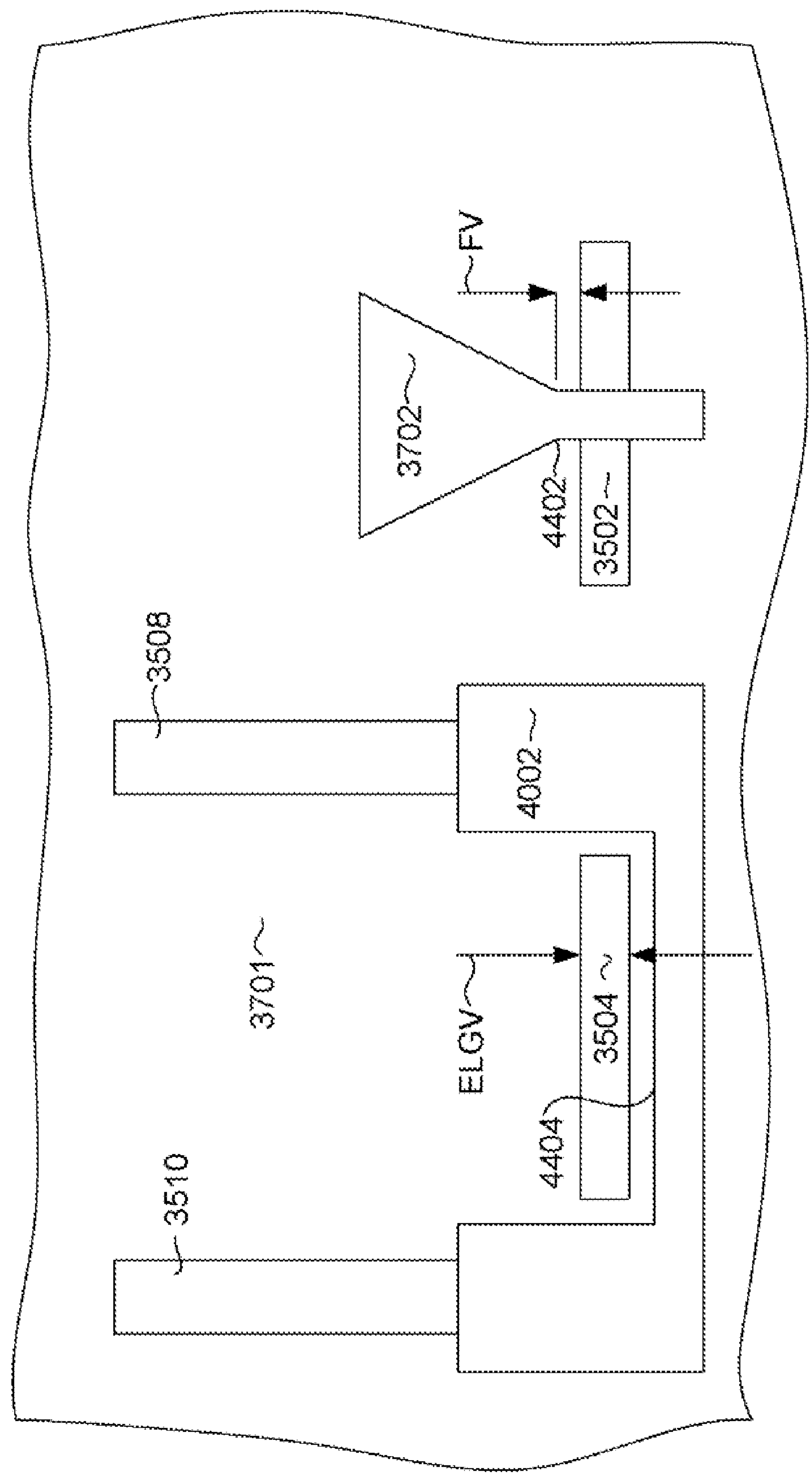
Figure 45:
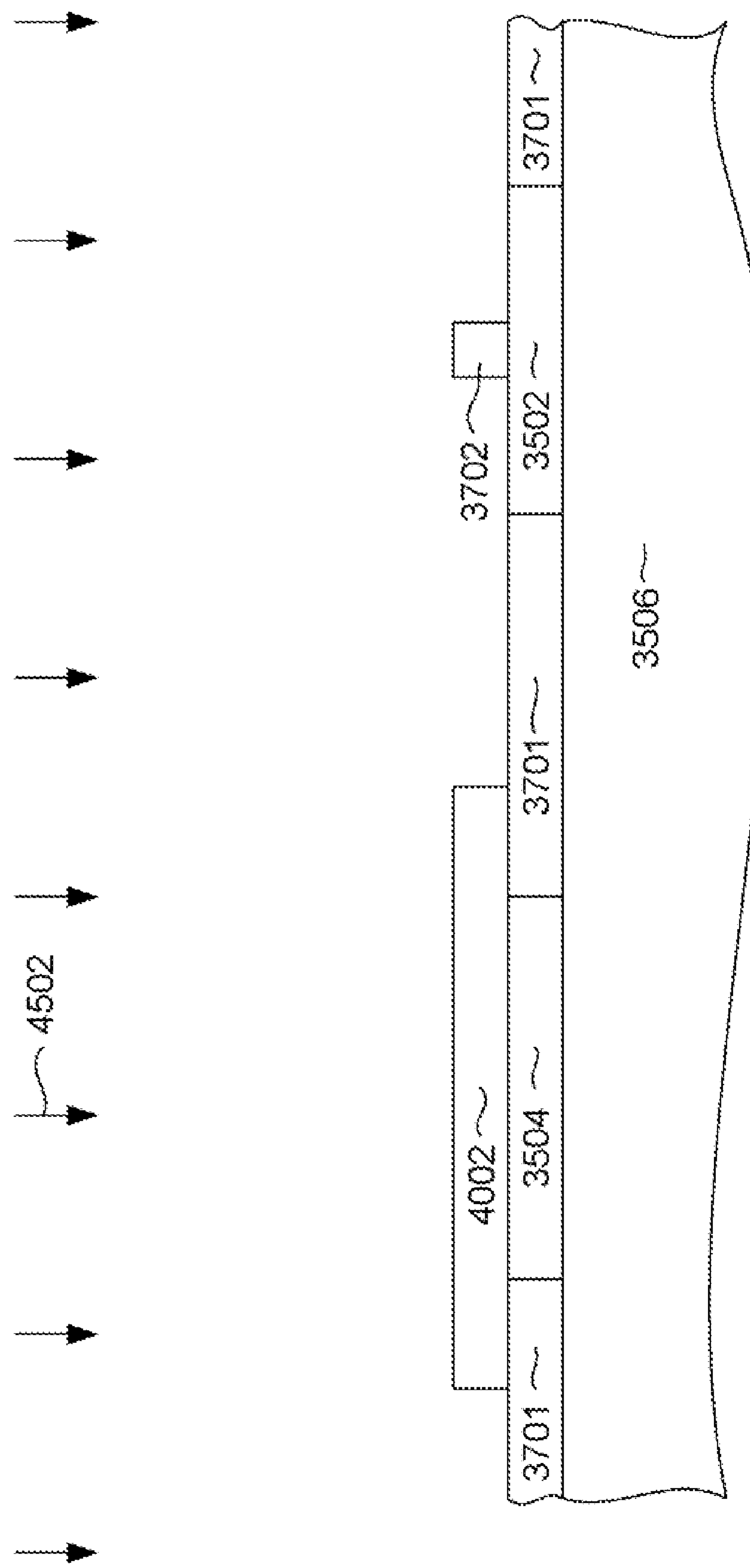

With reference to FIG. 44, a top down view of the structure shows that, the magnetic material 3702 forms a write pole, while the non-magnetic metal 4002 forms an electrical lapping guide (ELG). It can also be seen that the write pole 3702 has a flare point 4402, and that the distance between the flare point and the back edge of the marker 3502 can be measured as a flare point variation distance (FV). Similarly, the distance between the back edge 4404 of the ELG 4002 and the marker 3504 can be measured as an ELG variation (ELGV). As mentioned above, certain processes cause the flare point 4402 and the back edge 4404 of the ELG both to move relative to one another. For example, the reactive ion etch (RIE) 4202 described with reference to FIG. 42 and the sweeping ion mill 4303 described with reference to FIG. 43, both cause the flare point 4402 and back edge 4404 of the ELG 4002 to move in opposite directions as material is removed. Because the ELG 4002 and the write pole 3702 are formed in the same photolithographic step, if it were not for these process induced variations, the flare point 4402 and ELG 4002 would be very well aligned with one another.

However, by monitoring the flare point variation FV and ELG variation ELGV, an accurate determination of the variation can be made and accounted for. The measurement of FV and ELGV can be made by an SEM (scanning electron microscope) measurement. After, the write pole 3702 and ELG 4002 have been constructed, the contact pads 3508, 3510 can be used to make electrical contact with the ELG 4002.

Figure 46:
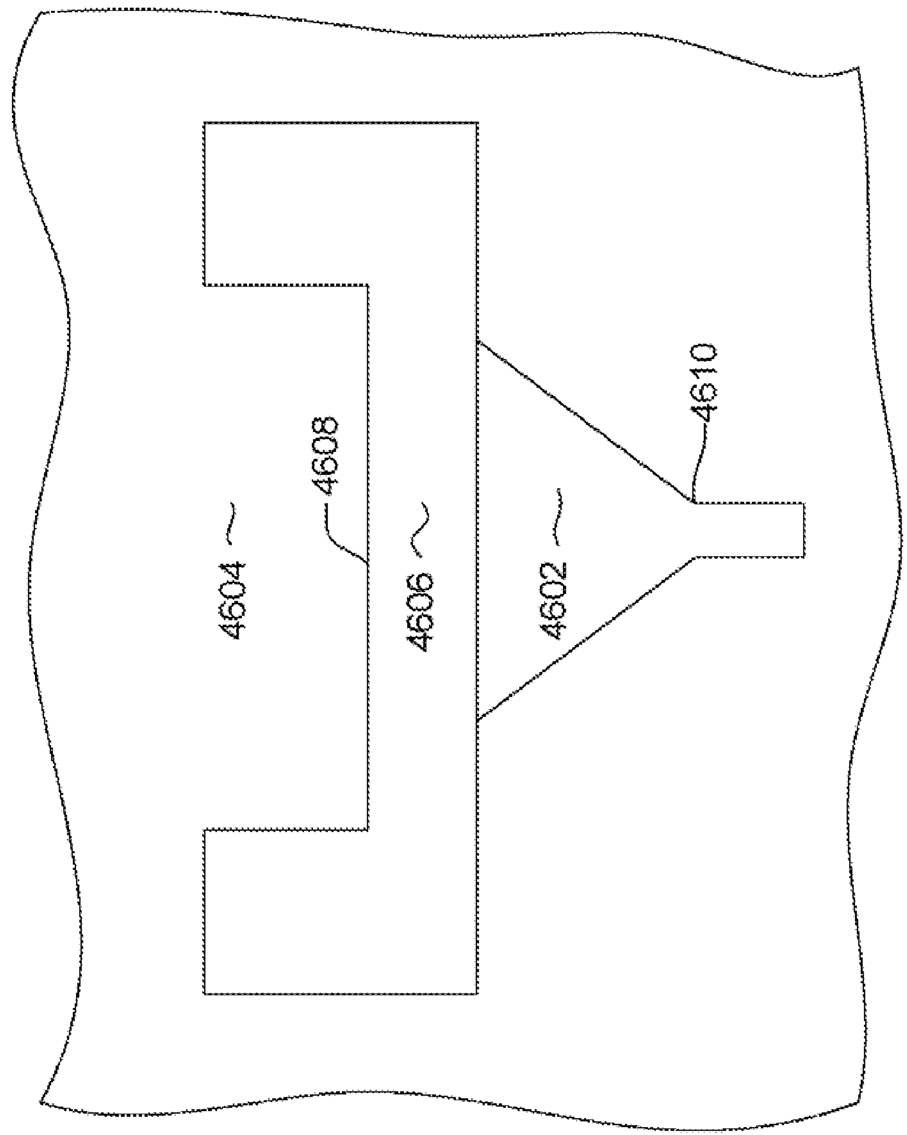
FIG. 46 is a top down view illustrating the use of a dummy write pole structure and a dummy lapping guide structure for monitoring flare point and lapping guide variation during head manufacture.

Another option to the markers is to build a test ELG structure as shown in FIG. 46. This test ELG structure has a dummy ELG feature 4604 and also a dummy write pole feature with a flare point 4602. The dummy ELG feature 4604 and dummy write pole 4602 can be constructed on a substrate 4606, such as alumina. The dummy write pole 4602 and dummy ELG 4604 can be constructed on a wafer that includes many actual write heads as described above. The wafer may include one dummy structure per row or may need only a limited number (eg. 10) of dummy features per wafer. The dummy write head 4602 is preferably constructed of the same material as a write pole on the functioning write heads (not shown in FIG. 46), and the dummy ELG 4604 can be constructed of the same material as the actual ELG structures (also not shown in FIG. 46). The dummy write pole 4602 and dummy ELG 4604 can be arranged so that the write pole 4602 is in front of the ELG 4604 (eg. in the ABS direction). The offset between back edge 4608 of ELG and flare point 4610 can be directly measured on this test structure using SEM without using marker as common reference.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of manufacturing a magnetic write head, comprising:

providing a substrate;

forming a magnetic write pole over the substrate;

depositing a non-magnetic, electrically conductive seed layer;

simultaneously forming first and second magnetic structures, the first magnetic structure being configured as a trailing magnetic shield, the second magnetic structure being configured to define an electrical lapping guide;

performing a material removal process to remove portions of the non-magnetic seed layer that are not protected by the first and second magnetic structures; and removing the second magnetic structure.

2. The method as in claim 1 wherein the forming first and second magnetic structures further comprises:

forming a mask structure having first and second openings, the first opening configured to define the trailing magnetic shield, and the second opening configured to define the electrical lapping guide;

depositing a magnetic material; and removing the mask structure.

3. The method as in claim 1 wherein the non-magnetic, electrically conductive seed layer comprises Rh, Ir, Ru, Au, W, Ta, or any other noble metal.

4. The method as in claim 1 wherein the removing the non-magnetic, electrically conductive seed layer from areas not protected by the first and second magnetic structures comprises ion milling.

5. The method as in claim 1 wherein the removing the second magnetic structure comprises protecting the first magnetic structure with a mask structure, and performing a chemical etching to remove the second magnetic structure.

6. The method as in claim 5 wherein the mask structure comprises photoresist.

7. The method as in claim 1 further comprising performing a lapping operation on a surface having a plane that is parallel with an air bearing surface of the write head while measuring an electrical resistance across the electrical lapping guide, and terminating the lapping operation when a predetermined electrical resistance is reached, the lapping operation being performed so as to remove a portion of the first and second magnetic structure.

* * * * *

UNITED STATES PATENT AND TRADEMARK OFFICE

CERTIFICATE OF CORRECTION

PATENT NO. : 7,788,796 B2
APPLICATION NO. : 11/611824
DATED : September 7, 2010
INVENTOR(S) : Wen-Chien David Hsiao et al.

It is certified that error appears in the above-identified patent and that said Letters Patent is hereby corrected as shown below:

On the Title Page, Item (54), and in the Specification, Column 1, lines 1-2 replace "METHOD FPR MANUFACTURING A MAGNETIC WRITE HEAD" with --METHOD FOR MANUFACTURING A MAGNETIC WRITE HEAD--.

Signed and Sealed this
Seventh Day of July, 2015

Michelle K. Lee
*Director of the United States Patent and Trademark Office*